United States Patent
Handelman et al.

(10) Patent No.: US 7,181,139 B2
(45) Date of Patent: **\*Feb. 20, 2007**

(54) OPTICAL SWITCHING APPARATUS AND METHODS

(75) Inventors: Doron Handelman, Givatayim (IL); Uri Mahlab, Or Yehuda (IL)

(73) Assignees: ECI Telecom Ltd., Petach Tikva (IL); Doron Handelman, Givatavim (IL)

( \* ) Notice: Subject to any disclaimer, the term of this patent is extended or adjusted under 35 U.S.C. 154(b) by 828 days.

This patent is subject to a terminal disclaimer.

(21) Appl. No.: 09/976,243

(22) Filed: Oct. 15, 2001

(65) Prior Publication Data
US 2002/0048067 A1    Apr. 25, 2002

Related U.S. Application Data

(63) Continuation-in-part of application No. 09/624,983, filed on Jul. 25, 2000, now Pat. No. 6,763,191.

(51) Int. Cl.
*H04J 14/00* (2006.01)

(52) U.S. Cl. .............................. 398/47; 398/51; 398/54

(58) Field of Classification Search .................. 398/34, 398/35, 45, 47–49, 52, 68, 71, 46, 74, 75, 398/77
See application file for complete search history.

(56) References Cited

U.S. PATENT DOCUMENTS 4,626,075 A    12/1986    Chemla (Continued)

FOREIGN PATENT DOCUMENTS

IL    124639    9/2001

OTHER PUBLICATIONS

"New multiprotocol WDM/CDMA-based optical switch architecture"; Benhaddou et al.; Simulation Symposium 2001. Proceedings. 34th Annual, Apr. 22-26, 2001, pp. 285-291.*

(Continued)

*Primary Examiner*—Jason Chan
*Assistant Examiner*—Nathan Curs
(74) *Attorney, Agent, or Firm*—Browdy and Neimark, PLLC

(57) ABSTRACT

An optical switching apparatus in an optical communication network selectively combines and separates, using OTDM and/or WDM, optical signal samples that are obtained by a spread spectrum technique or a combination of optical signal samples that are obtained by a spread spectrum technique and optical signal samples that are carried over discrete channel wavelengths. In upstream communication, when optical signal samples that are received at the optical switching apparatus include upstream optical signal samples that are obtained by a spread spectrum technique, the optical switching apparatus optically converts the optical signal samples provided thereto into a broadband combined series of upstream optical signal samples and routes the broadband combined series of upstream optical signal samples to a destination route. In downstream communication, when the optical switching apparatus receives a broadband series of downstream optical signal samples obtained by utilizing a spread spectrum technique, the optical switching apparatus optically converts the broadband series of downstream optical signal samples into an integer number nn>1 of series of downstream optical signal samples that include at least one of the following: broadband series of downstream optical signal samples; and series of downstream optical signal samples having the downstream optical signal samples carried over discrete channel wavelengths. The nn series of downstream optical signal samples are then routed to nn routes respectively. Related apparatus and methods are also described.

17 Claims, 7 Drawing Sheets

U.S. PATENT DOCUMENTS

| | | | |
|---|---|---|---|
| 4,726,010 A | 2/1988 | Ali et al. | |
| 5,170,273 A | 12/1992 | Nishio | |
| 5,191,457 A | 3/1993 | Yamazaki | |
| 5,194,977 A | 3/1993 | Nishio | |
| 5,319,484 A | 6/1994 | Jacob et al. | |
| 5,325,222 A | 6/1994 | Jacob et al. | |
| 5,400,322 A | 3/1995 | Hunt et al. | |
| 5,416,625 A | 5/1995 | Cavaciuti et al. | |
| 5,452,115 A | 9/1995 | Tomioka | |
| 5,457,687 A | 10/1995 | Newman | |
| 5,479,447 A | 12/1995 | Chow et al. | |
| 5,557,439 A | 9/1996 | Alexander et al. | |
| 5,680,490 A | 10/1997 | Cohen et al. | |
| 5,712,932 A | 1/1998 | Alexander et al. | |
| 5,724,167 A | 3/1998 | Sabella | |
| 5,739,935 A | 4/1998 | Sabella | |
| 5,774,244 A | 6/1998 | Tandon et al. | |
| 5,867,289 A | 2/1999 | Gerstel et al. | |
| 5,953,138 A | 9/1999 | Ellis | |
| 6,023,360 A | 2/2000 | Morioka et al. | |
| 6,108,112 A | 8/2000 | Touma | |
| 6,204,944 B1 | 3/2001 | Uchiyama et al. | |
| 6,233,082 B1 | 5/2001 | Johnson | |
| 6,288,808 B1* | 9/2001 | Lee et al. | 398/49 |
| 6,314,115 B1 | 11/2001 | Delfyett et al. | |
| 6,763,191 B1* | 7/2004 | Handelman | 395/45 |

OTHER PUBLICATIONS

"Code-division multiple access: novel multiplexing strategy in optical fiber networks"; Meghavoryan et al.; Transparent Optical Networks, 2001. Proceedings of 2001 3rd International Conference on, Jun. 18-21, 2001, pp. 299-303.*

Fiber Optic Product News Journal, "OCDMA Promises Disruptive New Metro Network Model", Mar. 2001, pp. 114 and 116.

Jones, Nevin and Trevor Wilson, "A Justification for a Variable Bandwidth Allocation Methodology for SONET Virtually Concatenated SPEs", Lucent Technologies, Jul. 10-14, 2000.

Jones et al, "Higher Order SONET Virtual Concatenation", Lucent Technologies, Apr. 9, 1999.

Autry, Chris and Henry Owen, Chapter 39, "Synchronous Optical Network (SONET)", The Communications Handbook, Jerry Gibson, Ed., CRS Press, Salem, MA, 1997, pp. 542-553.

Autry, Chris and Henry Owen, Chapter 40, "Synchronous Digital Hierarchy (SDH)", ), The Communications Handbook, Jerry Gibson, Ed., CRS Press, Salem, MA, 1997, pp. 554-564.

Wilner, A., "Mining the Optical Bandwidth for a Terabit per Second," IEEE Spectrum, Apr. 1997, pp. 32-41.

"Record Data-Transmission Rate Reported at ECOC '96", Laser Focus World, Nov. 1996, pp. 40-42.

Lerner, E., Multiple Wavelengths Exploit Fiber Capacity, Laser Focus World, Jul. 1997, pp. 119-125.

Zankowsky, D., "Advances in Dense WDM Push Diode-Laser Design", Laser Focus World, Aug. 1997, pp. 167-171.

"Multistage Amplifier Provides Gain Across 80 nm," pp. 22-23.

Hecht, J., "Optical Switching Promises Cure for Telecommunications Logjam," Laser Focus World, Sep. 1998, pp. 69-72.

Gibson, J., The Communications Handbook, 1997, pp. 883-890.

Kazovsky et al., "WDM Local Area Networks," IEEE LTS, May 1992, pp. 9-15.

Flipse, R., Optical Switches Ease Bandwidth Crunch, EuroPhotonics, Aug./Sep. 1998, pp. 44-45.

Weiss, S., "Speed Demons: Is 'Faster Better and Cheaper?," Photonics Spectra, Feb. 1999, pp. 96-102.

Miskovic, E., "Wavelength Lockers Keep Lasers in Line," Photonics Spectra, Feb. 1999, pp. 104-110.

Jones-Bey, H., "Optical Switches Pursue Crossconnect Markets," Laser Focus World, May 1998, pp. 153-162.

Nerig, R., "Demand Triggers Advances in Dense WDM Components," Optoelectronics World, Sep. 1998, pp. s5-s8.

Escobar, H., "Optical Networks," Photonics Spectra, Dec. 1998, pp. 163-167.

Wheeler, M., "Ultrafast Optical Switch Unveiled," Photonics Spectra, Dec. 1998, p. 42.

Collins, J. et al., "Data Express, Gigabit Junction With the Next-Generation Internet," IEEE Spectrum, Feb. 1999, pp. 18-25.

Lam, J., "Designing Broadband Fiber Optic Communications Systems," Communication Systems Design, Feb. 1999.

"Terabit-Transmission Demonstrations Make Splash at OFC '96," Laser Focus World, Apr. 1996, p. 13.

Rolland, C. et al., Multigigabit Networks: The Challenge, IEEE LTS, May 1992, pp. 16-26.

Green, P. et al., "Direct Detection Lightwave Systems: Why Pay More?", IEEE LCS, Nov. 1990, pp. 36-49.

Hinton, S., "Photonics in Switching", IEEE LTS, Aug. 1992. pp. 26-35.

Taba, H. et al., "Advanced Technology for Fiber Optic Suscriber Systems," IEEE LTS, Nov. 1992, pp. 12-18.

Lerner, E., "Fiber Amplifiers Expand Network Capacities," Laser Focus World, Aug. 1997, pp. 85-96.

Mochida, Y., "Technologies for Local-Access Fibering," IEEE Communications Magazine, Feb. 1994, pp. 64-72.

Ganz et al., Wavelength Assignment in Multiphop Lightwave Networks, IEEE Transactions on Communications, vol. 42, No. 7, Jul. 1994, pp. 246-2469.

Suzuki et al., Wavelength-Division Switching Technology in Photonic Switching Systems, IEEE International Conference on Communications, ICC 1990, pp. 1125-1129.

Labourdette et al., "Branch-Exchange Sequences for Reconfiguration of Lightwave Networks," IEEE Transactions on Communications, vol. 42, No. 10, Oct. 1994, pp. 2822-2832.

Auerbach et al., Use of Delegated Tuning and Forwarding in Wavelength Division Multiple Access Networks, IEEE Transactions on Communications, vol. 43, No. 1, Jan. 1995, pp. 52-63.

Maier, G. et al., "Design and Cost Performance of the Multistage WDN-PON Access Network," Journal of Lightwave Technology, vol. 18, No. 2, Feb. 2000, pp. 125-143.

"Polarization Insensitive Widely-Tunable All-Optical Clock Recovery Based on AM Mode-Locking of a Fiber Ring Laser," IEEE Photonics Technology Letters, vol. 12, No. 2, Feb. 2000, pp. 211-213.

"Ultra-High-Speed PLL-Type Clock Recovery Circuit Based on All-Optical Gain Modulation in Traveling-Wave Laser Diode Amplifier," Journal of Lightwave Technology, vol. 11, No. 12, Dec. 1993, pp. 2123-2129.

Hecht, J., All-Optical Networks Need Optical Switches, Laser Focus World, May 2000, pp. 189-196.

Goldberg, L., "Photons at Work: Optical Networks on the Rise," Electronic Design, Mar. 22, 1999, pp. 56-66.

Pattavina, A., "Asynchronous Time Division Switching," IEEE Communications Handbook, 1997, pp. 686-700.

Rubin, I., Multiple Access Methods for Communications Networks, IEEE Communications Handbook, 1997, pp. 622-649.

Pan and Shi, "Combining Gratings and Filters Reduces WDM Channel Spacing," ptoElectronics World, Sep. 1998, pp. S11-S17.

Hall et al., "Picosecond-Accuracy All-Optical Bit Phase Sensing Using a Nonlinear Optical Loop Mirror," IEEE Photonics Technology Letters, vol. 7, No. 8, Aug. 1995, pp. 935-937.

Hall et al., "An Ultrafast Variable Optical Delay Technique," IEEE Photonics Technology Letters, vol. 12, No. 2, Feb. 2000, pp. 208-210.

"Prescaled 6.3 GHz Clock Recovery From 50 Gbits/s TDM Optical Signal With 50 GHz PLL Using Four-Wave Mixing in a Travelling Wave Laser Diode Optical Amplifier," Electronic Letters, May 12, 1994, vol. 30, No. 10, pp. 807-809.

Klovekorn and Munch, "Variable Optical Delay Line With Diffraction Limited Autoalignment," Applied Optics, Apr. 1, 1998, vol. 37, No. 10, pp. 1903-1904.

Compact 40 Gbit/s Optical Demultiplexer Using a GAINAsP Optical Amplifier, Electronic Letters, Nov. 25, 1993, vol. 29, No. 24. pp. 2115-2116.

"Lucent Upgrades Wavestar to 20-Channel, 800-Gb/s Transmission: Chalmers Develops 49-dB Optical Parametric Amplfier," Photonics Spectra, Jun. 2000, p. 46.

Patrick et al., "Bit-Rate Flexible All-Optical Demultiplexing Using a Nonlinear Optical Loop Mirror," Electronic Letters, Apr. 15, 1993, vol. 29, No. 8, pp. 702-703.

Eiselt et al., "All-Optical High Speed Demultiplexing With a Semiconductor Laser Amplifier in a Loop Mirror Configuration," Electronics Letters, Jun. 24, 1993, vol. 29, No. 13, pp. 1167-1168.

"Optical Amplifier Revolutionize Communications," Laser Focus World, Sep. 1998, pp. 28-32.

"Single Interferometer Demultiplexes 40-Gbit/s Optical-Time-Division-Multiplexed Signal," Laser Focus World, Nov. 1999, p. 11.

"Fiber-Optic Chips Multiplex 16 T1/E1 Channels Over One Cable," Electronic Design, Apr. 17, 2000, p. 46.

Binetti et al., "Analysis and Dimensioning of Switchless Networks for Single-Layer Optical Architecture," Journal of Lightwave Technology, vol. 18, No. 2, Feb. 2000, pp. 114-153.

Hall et al, "100-Gbit/s Bitwise Logic," MIT Lincoln Laboratory, Optics Letters, vol. 23, No. 16, Aug. 15, 1998, pp. 1271-1273.

Blixt and Bowers, "An Optical Technique for Bit and Packet Synchronization," IEEE Photonics Technology Letters, vol. 7, No. 1, Jan. 1995, pp. 123-125.

"Double-Spreading Modulation Scheme Picks up Where CDMA and TDMA Leave off," Electronics Designs, pp. 28-32, Jul. 10, 2000.

Ellis et al., "Transmission of a True Single Polarisation 40 Gbit/s Soliton Data Signal Over 205km Using a Stabilized Erbium Fibre Ring Laser and 40 GHz Electronic Timing Recovery," Electronics Letters, vol. 29, No. 11, pp. 990-992, May 27, 1993.

Jalaii et al., "Time-Stretch Methods Capture Fast Waveforms," Microwaves & RF, Apr. 1999, pp. 62-69.

Wakui, "The Fiber-Optic Subscriber Network in Japan," IEEE Communications Magazine, pp. 56-63, Feb. 1994.

* cited by examiner

OPTICAL SWITCHING APPARATUS AND METHODS

CROSS-REFERENCE TO RELATED APPLICATIONS

This application is a continuation-in-part of U.S. patent application Ser. No. 09/624,983 filed Jul. 25, 2000, now U.S. Pat. No. 6,763,191.

FIELD OF THE INVENTION

The present invention relates to optical communication networks generally, and more particularly to optical switching in optical communication networks.

BACKGROUND OF THE INVENTION

The increase in data rates of data carried by optical communication networks that is experienced today makes switching operations that require optical-to-electronic and electronic-to-optical conversions of communicated information undesirable. On the other hand, all-optical switching in all-optical communication networks, particularly in applications that involve wavelength division multiplexing (WDM) and in applications that require speedup and slow-down of the communicated information, is not trivial. Thus, efficient techniques for all-optical switching that supports speedup and slow-down of communicated information in non-WDM based optical communication networks and in WDM based optical communication networks are still required.

A technique that uses a delay line together with multiplexing and modulation in order to increase a data rate of data carried over a single fiber optic cable is described in an article entitled "Mining the Optical Bandwidth for a Terabit per Second", by Alan Eli Willner in *IEEE Spectrum*, April 1997, pp. 32–41. However, the technique described by Willner is not suitable for use with a plurality of separate fiber optic cables carrying data after the data is already modulated, and is also not suitable for use in cases where there is no synchronization among separate fiber optic cables carrying data.

Some aspects of technologies and art related to all-optical clock-recovery in optical communication networks are described in the following publications:

an article entitled "Polarization Insensitive Widely Tunable All-Optical Clock Recovery Based on AM Mode-Locking of a Fiber Ring Laser", by Wang et al in *IEEE Photonics Technology Letters*, Vol. 12, No. 2, February 2000, pp. 211–213;

an article entitled "Ultra-High-Speed PLL-Type Clock Recovery Circuit Based on All-Optical Gain Modulation in Traveling-Wave Laser Diode Amplifier", by Kawanishi et al in *Journal of Lightwave Technology*, Vol. 11, No. 12, December 1993, pp. 2123–2129; and an article entitled "Prescaled 6.3 GHz clock recovery from 50 GBit/s TDM optical signal with 50 GHz PLL using four-wave mixing in a traveling-wave laser diode optical amplifier", by Kamatani et al in *Electronics Letters*, Vol. 30, No. 10, May 12, 1994, pp. 807–809.

Some aspects of technologies and art related to delay line techniques are described in the following publications:

an article entitled "Variable optical delay line with diffraction-limited autoalignment" by Klovekorn et al in *Applied Optics*, Vol. 37, No. 10, Apr. 1, 1998, pp. 1903–1904;

an article entitled "Picosecond-Accuracy All-Optical Bit Phase Sensing Using a Nonlinear Optical Loop Mirror", by Hall et al in *IEEE Photonics Technology Letters*, Vol. 7, No. 8, August 1995, pp. 935–937; and an article entitled "An Ultrafast Variable Optical Delay Technique", by Hall et al in *IEEE Photonics Technology Letters*, Vol. 12, No. 2, February 2000, pp. 208–210.

Some aspects of technologies and art related to all-optical demultiplexing techniques are described in the following publications:

an article entitled "Compact 40 Gbit/s optical demultiplexer using a GaInAsP optical amplifier", by Ellis et al in *Electronics Letters*, Vol. 29, No. 24, Nov. 25, 1993, pp. 2115–2116;

an article entitled "Bit-Rate Flexible All-Optical Demultiplexing Using a Nonlinear Optical Loop Mirror", by Patrick et al in *Electronics Letters*, Vol. 29, No. 8, Apr. 15, 1993, pp. 702–703; and an article entitled "All-Optical High Speed Demultiplexing with a Semiconductor Laser Amplifier in a loop Mirror Configuration", by Eiselt et al in *Electronics Letters*, Vol. 29, No. 13, Jun. 24, 1993, pp. 1167–1168.

Some aspects of technologies and art related to WDM based and non-WDM based optical communication networks and to optical switching techniques and elements associated therewith are described in the following publications:

*The Communications Handbook*, CRC Press & IEEE Press, 1997, Editor-in-Chief Jerry D. Gibson, Chapter 65, pp. 883–890;

an article entitled "Optical switching promises cure for telecommunications logjam", by Jeff Hecht in *Laser Focus World* September 1998, pp. 69–72;

a technology brief entitled "Lucent Upgrades Wavestar to 320-Channel, 800-Gb/s Transmission", in *Photonics Spectra*, June 2000, pp. 46;

an article entitled "Design and Cost Performance of the Multistage WDM-PON Access Networks", by Maier et al in *Journal of Lightwave Technology*, Vol. 18, No. 2, February 2000, pp. 125–143;

an article entitled "All-optical networks need optical switches", by Jeff Hecht in *Laser Focus World*, May 2000, pp. 189–196;

an article entitled "Record Data Transmission Rate Reported at ECOC 96", by Paul Mortensen in *Laser Focus World*, November 1996, pp. 40–42;

an article entitled "Multiple Wavelengths Exploit Fiber Capacity", by Eric J. Lerner in *Laser Focus World*, July 1997, pp. 119–125;

an article entitled "Advances in Dense WDM Push Diode-Laser Design", by Diana Zankowsky in *Laser Focus World*, August 1997, pp. 167–172;

an article entitled "Multistage Amplifier Provides Gain Across 80 nm", by Kristin Lewotesky in *Laser Focus World*, September 1997, pp. 22–24;

an article entitled "WDM Local Area Networks", by Kazovsky et al in *IEEE LTS*, May 1992, pp. 8–15;

an article entitled "Optical Switches Ease Bandwidth Crunch", by Rien Flipse in *EuroPhotonics*, August/September 1998, pp. 44–45;

an article entitled "Speed Demons: Is "Faster Better and Cheaper?", by Stephanie A. Weiss in *Photonics Spectra*, February 1999, pp. 96–102;

an article entitled "Wavelength Lockers Keeps Lasers in Line", by Ed Miskovic in *Photonics Spectra*, February 1999, pp. 104–110;

an article entitled "Optical switches pursue crossconnect markets", by Hassaun Jones-Bay in *Laser Focus World*, May 1998, pp. 153–162;

a conference review entitled "Optical amplifiers revolutionize communications", by Gary T. Forrest in *Laser Focus World* September 1998, pp. 28–32;

an article entitled "Combining gratings and filters reduces WDM channel spacing", by Pan et al in *Optoelectronics World*, September 1998, pp. S11–S17;

an article entitled "Demand triggers advances in dense WDM components", by Raymond Nering in *Optoelectronics World*, September 1998, pp. S5–S8;

an article entitled "Optical Networks Seek Reconfigurable Add/Drop Options", by Hector E. Escobar in *Photonics Spectra*, December 1998, pp. 163–167;

an article entitled "Ultrafast Optical Switch Unveiled", by Michael D. Wheeler in *Photonics Spectra*, December 1998, pp. 42;

an article entitled "Data express Gigabit junction with the next-generation Internet", by Collins et al in *IEEE Spectrum*, February 1999, pp. 18–25;

an article entitled "Designing Broadband Fiber Optic Communication Systems", by Juan F. Lam in *Communication Systems Design* magazine, February 1999, pp. 1–4 at http://www.csdmag.com;

an article entitled "Terabit/second-transmission demonstrations make a splash at OFC '96", in *Laser Focus World*, April 1996, pp. 13;

an article entitled "Multigigabit Networks: The Challenge", by Rolland et al in *IEEE LTS*, May 1992, pp. 16–26;

an article entitled "Direct Detection Lightwave Systems: Why Pay More?", by Green et al in *IEEE LCS*, November 1990, pp. 36–49;

an article entitled "Photonics in Switching", by H. Scott Hinton in *IEEE LTS*, August 1992, pp. 26–35;

an article entitled "Advanced Technology for Fiber Optic Subscriber Systems", by Toba et al in *IEEE LTS*, November 1992, pp. 12–18;

an article entitled "Fiber amplifiers expand network capacities", by Eric J. Lerner in *Laser Focus World*, August 1997, pp. 85–96;

an article entitled "Technologies for Local-Access Fibering", by Yukou Mochida in *IEEE Communications Magazine*, February 1994, pp. 64–73;

an article entitled "Wavelength Assignment in Multihop Lightwave Networks", by Ganz et al in *IEEE Transactions on Communications*, Vol. 42, No. 7, July 1994, pp. 2460–2469;

an article entitled "Wavelength-Division Switching Technology in Photonic Switching Systems", by Suzuki et al in IEEE International Conference on Communications, ICC '90, pp. 1125–1129;

an article entitled "Branch-Exchange Sequences for Reconfiguration of Lightwave Networks", by Labourdette et al in *IEEE Transactions on Communications*, Vol. 42, No. 10, October 1994, pp. 2822–2832; and an article entitled "Use of Delegated Tuning and Forwarding in Wavelength Division Multiple Access Networks", by Auerbach et al in *IEEE Transactions on Communications*, Vol. 43, No. 1, January 1995, pp. 52–63.

Additionally, asynchronous time-division switching is described in *The Communications Handbook*, CRC Press & IEEE Press, 1997, Editor-in-Chief Jerry D. Gibson, Chapter 51, pp. 686–700. Multiple access methods for communications networks are described in *The Communications Handbook*, CRC Press & IEEE Press, 1997, Editor-in-Chief Jerry D. Gibson, Chapter 46, pp. 622–649.

U.S. Pat. No. 5,170,273 to Nishio describes a cross-talk reducing optical switching system which receives electrical digital signals at its input terminal.

U.S. Pat. No. 5,191,457 to Yamazaki describes a WDM optical communication network in which optical beams are modulated by channel discrimination signals of different frequencies.

U.S. Pat. No. 5,194,977 to Nishio describes a wavelength division switching system with reduced optical components using optical switches.

U.S. Pat. No. 5,557,439 to Alexander et al. describes wavelength division multiplexed optical communication systems configured for expansion with additional optical signal channels.

U.S. Pat. No. 5,680,490 to Cohen et al. describes a comb splitting system which demultiplexes and/or multiplexes a plurality of optical signal channels at various wavelengths.

U.S. Pat. No. 5,712,932 to Alexander et al. describes reconfigurable wavelength division multiplexed systems which include configurable optical routing systems.

U.S. Pat. Nos. 5,724,167 and 5,739,935 to Sabella describe an optical cross-connect node architecture that interfaces plural optical fiber input and output links, each link containing plural wavelength channels.

U.S. Pat. No. 5,457,687 to Newman describes reactive congestion control in an ATM network where the network is formed by the interconnection of nodes each including a forward path for transfer of information from source to destination through the network and a return path for returning congestion control signals.

Copending U.S. patent application Ser. No. 09/126,378 filed on Jul. 30, 1998 and assigned to Doron Handelman, now U.S. Pat. No. 6,404,522, describes improvements in communication performance of an optical communication system that communicates data via N different channel wavelengths using WDM.

Copending U.S. patent application Ser. No. 09/389,345 filed on Sep. 3, 1999 and assigned to Doron Handelman, now U.S. Pat. No. 6,574,018, describes a network control system that may be embodied in various elements of a communication network that communicates optical signals multiplexed by WDM. The network control system may limit a number of channel wavelengths actually used for communicating optical signals to an end node, and control and modify data rates carried over channel wavelengths multiplexed by WDM.

The disclosures of all references mentioned above and throughout the present specification are hereby incorporated herein by reference.

SUMMARY OF THE INVENTION

The present invention seeks to improve optical switching and routing in all-optical communication networks, and particularly in wavelength division multiplexing (WDM) based optical communication networks.

In the present invention, an optical switching apparatus that is associated with a communication switch of an all-optical communication network enables speedup or slowdown of optical communication substantially without using optical-to-electronic and electronic-to-optical conversions of communicated information. In order to speedup or slowdown optical communication the optical switching apparatus combines or separates respectively series of optical signal samples representing the information by selectively using optical time-division multiplexing (OTDM) techniques and WDM techniques.

There is thus provided in accordance with a preferred embodiment of the present invention an optical switching method for switching n series of upstream optical signal samples to a destination route, each series of upstream optical signal samples in the n series of upstream optical signal samples being carried over a channel wavelength $\lambda_i$ at a data rate $DR_i$, where n is an integer and i is an index running from 1 to n, the method including the steps of optically converting the n series of upstream optical signal samples into a combined series of upstream optical signal samples having the upstream optical signal samples carried over a channel wavelength $\lambda_D$ at a combined data rate $DR_c$ which is greater than any separate $DR_i$, the channel wavelength $\lambda_D$ being useful for carrying optical signal samples to the destination route, and routing the combined series of upstream optical signal samples to the destination route. Preferably, $DR_c$ is one of the following: equal to $\Sigma_{i=1,\ldots,n} DR_i$, and similar to $\Sigma_{i=1,\ldots,n} DR_i$.

The optically converting step preferably includes converting any of the $\lambda_i$ that differ from $\lambda_D$ to $\lambda_D$ thereby forming a group of n series of upstream optical signal samples having the upstream optical signal samples carried over $\lambda_D$, and combining the n series of upstream optical signal samples in the group so as to provide the combined series of upstream optical signal samples.

Preferably, the upstream optical signal samples in each of the n series of upstream optical signal samples are spaced by a time spacing T, and the combining step includes recovering a clock signal $CLK_i$ for each series of upstream optical signal samples in the group, generating time delays of at least a fraction of T between every two series of upstream optical signal samples in the group so as to create a group of n sequentially delayed series of upstream optical signal samples in which a delay between every two series of upstream optical signal samples is at least a fraction of T, and multiplexing the n sequentially delayed series of upstream optical signal samples in the group so as to provide the combined series of upstream optical signal samples.

The combining step preferably includes multiplexing the n series of upstream optical signal samples in the group by using asynchronous time-division multiplexing when at least some of the data rates $DR_1, \ldots, DR_n$ are different from each other.

Preferably, the destination route includes at least one of the following: a destination fiber optic cable capable of carrying optical signal samples at the combined data rate $DR_c$, a wireless communication route, a waveguide, a transmission line, an interface to a destination optical transceiver, and an interface to a destination optical communication system operating at the combined data rate $DR_c$.

In a case where the n series of upstream optical signal samples are coded in a line code other than a return-to-zero (RZ) line code, the method also includes converting the n series of upstream optical signal samples coded in the line code other than an RZ line code into n series of RZ coded upstream optical signal samples prior to the optically converting step, and converting the combined series of upstream optical signal samples into a combined series of upstream optical signal samples coded in the line code other than an RZ line code after the optically converting step.

Preferably, the method also includes the step of selecting the channel wavelength $\lambda_D$ prior to the optically converting step.

The method may also preferably include, prior to the optically converting step, the steps of selecting the n series of upstream optical signal samples from groups of $k_1, \ldots, k_m$ series of upstream optical signal samples that are respectively carried over m separate fiber optic cables in a wavelength division multiplexed form over channel wavelengths $\{\lambda_{ii,jj}\}$ at data rates $\{DR_{ii,jj}\}$ respectively, where $k_1, \ldots, k_m$ are integers greater than one, m is an integer greater than or equal to one, ii is an index running from 1 to m, and jj is an index running from 1 to $k_j$ where j is an index running from 1 to m, and dropping the n series of upstream optical signal samples from those of the m separate fiber optic cables that carry the n series of upstream optical signal samples.

Preferably, the dropping step includes demultiplexing at least those of the groups of $k_1, \ldots, k_m$ series of upstream optical signal samples that include the n series of upstream optical signal samples so as to provide LK demultiplexed series of upstream optical signal samples, where LK is an integer greater than one, and selecting each of the n series of upstream optical signal samples from the LK demultiplexed series of upstream optical signal samples.

There is also provided in accordance with a preferred embodiment of the present invention an optical switching method for switching a series of downstream optical signal samples which is carried over a channel wavelength $\lambda_T$ at a data rate $DR_T$ to nn routes, where nn is an integer greater than one, the method including the steps of optically converting the series of downstream optical signal samples into nn series of downstream optical signal samples having the downstream optical signal samples carried over channel wavelengths $\lambda_1, \ldots, \lambda_{nn-1}, \lambda_T$ at data rates $DRT_1, \ldots, DRT_{nn}$ respectively, where $\lambda_1 \# \lambda_T, \ldots, \lambda_{nn-1} \# \lambda_T$ and each of $DRT_1, \ldots, DRT_{nn}$ is less than $DR_T$, and routing the nn series of downstream optical signal samples to the nn routes respectively.

Preferably, the optically converting step includes separating the series of downstream optical signal samples so as to provide a group of nn series of downstream optical signal samples having the optical signal samples in each series of downstream optical signal samples in the group carried over $\lambda_T$ at a respective one of the data rates $DRT_1, \ldots, DRT_{nn}$ and converting $\lambda_T$ of all except one of the series of downstream optical signal samples in the group into the channel wavelengths $\lambda_1, \ldots, \lambda_{nn-1}$ so as to provide the nn series of downstream optical signal samples having the downstream optical signal samples carried over the channel wavelengths $\lambda_1, \ldots, \lambda_{nn-1}, \lambda_T$ at the respective data rates $DRT_1, \ldots, DRT_{nn}$.

The separating step preferably includes using synchronous time-division demultiplexing for separating the series of downstream optical signal samples so as to provide the group of nn series of downstream optical signal samples in which $DRT_1 = \ldots = DRT_{nn}$, and using asynchronous time-division demultiplexing for separating the series of downstream optical signal samples so as to provide the group of nn series of downstream optical signal samples in which at least some of the data rates $DRT_1, \ldots, DRT_n$ are different from each other.

Additionally, the method also includes the step of selecting the channel wavelengths $\lambda_1, \ldots, \lambda_{nn-1}$ prior to the optically converting step.

Further in accordance with a preferred embodiment of the present invention there is also provided an optical communication signal useful for communication to at least one of a node server and an end node of an optical communication network, the optical communication signal including a series of optical signal samples having the optical signal samples carried over a channel wavelength $\lambda_D$ at a data rate $DR_c$, the series of optical signal samples being produced by optically converting n series of optical signal samples in which the optical signal samples are respectively carried over channel wavelengths $\lambda_1, \ldots, \lambda_n$ at data rates $DR_1, \ldots, DR_n$, where n is an integer and $DR_c$ is greater than any one of $DR_1, \ldots, DR_n$.

Still further in accordance with a preferred embodiment of the present invention there is also provided an optical switching method for switching to a destination route upstream optical signal samples that are obtained from a first source by a spread spectrum technique, and upstream optical signal samples that are obtained from additional NCC sources and include at least one of the following: upstream optical signal samples that are separately obtained from NS out of the NCC sources by the spread spectrum technique, and n series of upstream optical signal samples that are separately obtained from n out of the NCC sources and are carried over n discrete channel wavelengths, wherein the upstream optical signal samples obtained from the first source are provided at a data rate DRS, the upstream optical signal samples obtained from the NS sources are provided at data rates $DRSS_j$, and each series of upstream optical signal samples in the n series of upstream optical signal samples is carried over a discrete channel wavelength $\lambda_i$ at a data rate $DR_i$, where each of NCC, n and NS is an integer greater than or equal to one, i is an index running from 1 to n, and j is an index running from 1 to NS, the method including optically converting the upstream optical signal samples that are obtained from the first source and the upstream optical signal samples that are obtained from the additional NCC sources into a broadband combined series of upstream optical signal samples at a combined data rate $DR_c$ which is greater than any of the following: DRS, any separate $DRSS_j$, and any separate $DR_i$, and routing the broadband combined series of upstream optical signal samples to the destination route.

Preferably, each of the upstream optical signal samples obtained from the first source and the upstream optical signal samples obtained from the NS sources includes upstream optical signal samples that occupy a wavelength band, and the optically converting includes dropping the upstream optical signal samples obtained from the first source and at least one of the following: the upstream optical signal samples that are separately obtained from the NS sources, and the n series of upstream optical signal samples, converting the dropped upstream optical signal samples obtained from the first source into a first series of upstream optical signal samples centered around a channel wavelength $\lambda_D$, and respectively converting at least one of the following: the dropped upstream optical signal samples that are separately obtained from the NS sources into NS series of upstream optical signal samples centered around the channel wavelength $\lambda_D$, and any of the $\lambda_i$ that differ from $\lambda_D$ to $\lambda_D$ thereby forming a group of n series of upstream optical signal samples having the upstream optical signal samples carried over $\lambda_D$, and combining the following to obtain the broadband combined series of upstream optical signal samples: all the series of upstream optical signal samples centered around the channel wavelength $\lambda_D$, and the n series of upstream optical signal samples in the group. The channel wavelength $\lambda_D$ may preferably be selected prior to the converting.

Alternatively, each of the upstream optical signal samples obtained from the first source and the upstream optical signal samples obtained from the NS sources includes upstream optical signal samples that are randomly spread in a plurality of bands around a plurality of wavelengths, and the optically converting includes dropping the upstream optical signal samples obtained from the first source and at least one of the following: the upstream optical signal samples that are separately obtained from the NS sources, and the n series of upstream optical signal samples, converting the dropped upstream optical signal samples obtained from the first source into a first broadband series of upstream optical signal samples and respectively converting at least one of the following: the dropped upstream optical signal samples that are separately obtained from the NS sources into NS broadband series of upstream optical signal samples, and any of the $\lambda_i$ to a channel wavelength $\lambda_D$ thereby forming a group of n series of upstream optical signal samples having the upstream optical signal samples carried over $\lambda_D$, and respectively combining the following to obtain the broadband combined series of upstream optical signal samples: the first broadband series of upstream optical signal samples, the NS broadband series of upstream optical signal samples, and the n series of upstream optical signal samples in the group.

The destination route preferably includes at least one of the following: a destination fiber optic cable capable of carrying optical signal samples at the combined data rate $DR_c$, a wireless communication route, a waveguide, a transmission line, an interface to a destination optical transceiver, and an interface to a destination optical communication system capable of operating at the combined data rate $DR_c$.

There is further provided in accordance with a preferred embodiment of the present invention an optical switching method for switching to nn routes a broadband series of downstream optical signal samples obtained by utilizing a spread spectrum technique, where nn is an integer greater than one and the broadband series of downstream optical signal samples is provided at a data rate $DR_T$, the method including optically converting the broadband series of downstream optical signal samples into nn series of downstream optical signal samples at data rates $DRT_1, \ldots, DRT_{nn}$, the nn series of downstream optical signal samples including at least one of the following: NT broadband series of downstream optical signal samples, and NST series of downstream optical signal samples having the downstream optical signal samples carried over discrete channel wavelengths, where each of nn, NT and NST is an integer greater than or equal to one, and each of $DRT_1, \ldots, DRT_{nn}$, is less than $DR_T$, and routing the nn series of downstream optical signal samples to the nn routes respectively.

Preferably, the broadband series of downstream optical signal samples obtained by utilizing a spread spectrum technique includes downstream optical signal samples that occupy a wavelength band, and the optically converting includes separating the broadband series of downstream optical signal samples into nn series of downstream optical signal samples including at least one of the following: NT broadband series of downstream optical signal samples centered around a channel wavelength $\lambda_T$, and NST series of downstream optical signal samples each having the downstream optical signal samples carried over $\lambda_T$, respectively converting at least one of the following: the NT broadband series of downstream optical signal samples centered around $\lambda_T$ into NT broadband series of downstream optical signal samples centered around NT channel wavelengths of which NT−1 channel wavelengths are different from $\lambda_T$, and the NST series of downstream optical signal samples into NST series of downstream optical signal samples having the downstream optical signal samples carried over NST channel wavelengths of which NST−1 channel wavelengths are different from $\lambda_T$, and respectively adding the NT broadband series of downstream optical signal samples centered around NT channel wavelengths to NT routes of the nn routes, and the NST series of downstream optical signal samples carried over the NST channel wavelengths to NST routes of the nn routes.

Alternatively, the broadband series of downstream optical signal samples obtained by utilizing a spread spectrum technique includes downstream optical signal samples that are randomly spread in a plurality of bands around a plurality of wavelengths, and the optically converting includes separating the broadband series of downstream optical signal samples into nn series of downstream optical signal samples including at least one of the following: NT broadband series of downstream optical signal samples, and NST series of downstream optical signal samples each having the downstream optical signal samples carried over $\lambda_T$, respectively converting at least one of the following: the NT broadband series of downstream optical signal samples into NT broadband series of downstream optical signal samples randomly spread in a plurality of bands around a plurality of wavelengths, and the NST series of downstream optical signal samples into NST series of downstream optical signal samples having the downstream optical signal samples carried over NST channel wavelengths of which NST−1 channel wavelengths are different from $\lambda_T$, and respectively adding the NT broadband series of downstream optical signal samples randomly spread in a plurality of bands around a plurality of wavelengths to NT routes of the nn routes, and the NST series of downstream optical signal samples carried over the NST channel wavelengths to NST routes of the nn routes.

In accordance with yet another preferred embodiment of the present invention there is also provided an optical switching apparatus for switching n series of upstream optical signal samples to a destination route, each series of upstream optical signal samples in the n series of upstream optical signal samples being carried over a channel wavelength $\lambda_i$ at a data rate $DR_i$, where n is an integer and i is an index running from 1 to n, the optical switching apparatus including an upstream optical converter unit operative to convert the n series of upstream optical signal samples into a combined series of upstream optical signal samples having the upstream optical signal samples carried over a channel wavelength $\lambda_D$ at a combined data rate $DR_c$ which is greater than any separate $DR_i$, the channel wavelength $\lambda_D$ being useful for carrying optical signal samples to the destination route, and an upstream router operatively associated with the upstream optical converter unit and operative to route the combined series of upstream optical signal samples to the destination route.

Additionally, the optical switching apparatus may also preferably include a controller operatively associated with the upstream optical converter unit and operative to perform at least one of the following: to determine the number n of series of upstream optical signal samples, and to select the channel wavelength $\lambda_D$.

Preferably, the upstream optical converter unit includes an upstream wavelength converter unit operative to convert any of the $\lambda_i$ that differ from $\lambda_D$ to $\lambda_D$ thereby forming a group of n series of upstream optical signal samples having the upstream optical signal samples carried over $\lambda_D$, and a combiner operatively associated with the upstream wavelength converter unit and operative to combine the n series of upstream optical signal samples in the group so as to provide the combined series of upstream optical signal samples.

The upstream optical signal samples in each of the n series of upstream optical signal samples are preferably spaced by a time spacing T, and the combiner preferably includes a clock-recovery unit operative to recover a clock signal $CLK_i$ for each series of optical signal samples in the group, an optical delay mechanism operatively associated with the clock-recovery unit and operative to generate time delays of at least a fraction of T between every two series of upstream optical signal samples in the group so as to create a group of n sequentially delayed series of upstream optical signal samples in which a delay between every two series of upstream optical signal samples is at least a fraction of T, and a multiplexer operatively associated with the optical delay mechanism and operative to multiplex the n sequentially delayed series of upstream optical signal samples in the group so as to provide the combined series of upstream optical signal samples.

Preferably, at least some of the data rates $DR_i$ are different from each other, and the combiner includes an asynchronous time-division multiplexer.

Additionally, the apparatus may also preferably include, for use in a case where the n series of upstream optical signal samples are coded in a line code other than an RZ line code, a line code converter unit operatively associated with the upstream optical converter unit and the upstream router and operative to convert the n series of upstream optical signal samples coded in the line code other than an RZ line code into n series of RZ coded upstream optical signal samples prior to conversion of the n series of upstream optical signal samples into the combined series of upstream optical signal samples by the upstream optical converter unit, and to convert the combined series of upstream optical signal samples into a combined series of upstream optical signal samples coded in the line code other than an RZ line code after conversion of the n series of upstream optical signal samples into the combined series of upstream optical signal samples by the upstream optical converter unit.

Preferably, the controller, or an additional controller that may be included in the optical switching apparatus and operatively associated with the upstream optical converter unit, is operative to select the n series of upstream optical signal samples from groups of $k_1, \ldots, k_m$ series of upstream optical signal samples that are respectively carried over m separate fiber optic cables in a wavelength division multiplexed form over channel wavelengths $\{\lambda_{ii,jj}\}$ at data rates $\{DR_{ii,jj}\}$ respectively, where $k_1, \ldots, k_m$ are integers greater than one, m is an integer greater than or equal to one, ii is an index running from 1 to m, and jj is an index running from 1 to $k_j$ where j is an index running from 1 to m, and a multiplexing/demultiplexing unit operatively associated with the upstream optical converter unit and the controller and operative to drop the n series of upstream optical signal samples selected by the controller from those of the m separate fiber optic cables that carry the n series of upstream optical signal samples. The multiplexing/demultiplexing unit preferably includes at least one add drop multiplexer (ADM).

There is also provided in accordance with still another preferred embodiment of the present invention an optical switching apparatus for switching a series of downstream optical signal samples which is carried over a channel wavelength $\lambda_T$ at a data rate $DR_T$ to nn routes, where nn is an integer greater than one, the optical switching apparatus including a downstream optical converter unit operative to optically convert the series of downstream optical signal samples into nn series of downstream optical signal samples having the downstream optical signal samples carried over channel wavelengths $\lambda_1, \ldots, \lambda_{nn-1}, \lambda_T$ at data rates $DRT_1, \ldots, DRT_{nn}$ respectively, where $\lambda_1 \neq \lambda_T, \ldots, \lambda_{nn-1} \neq \lambda_T$ and each of $DRT_1, \ldots, DRT_{nn}$ is less than $DR_T$, and a downstream router operatively associated with the downstream optical converter unit and operative to route the nn series of downstream optical signal samples to the nn routes respectively.

Preferably, the downstream optical converter unit includes a demultiplexer operative to separate the series of downstream optical signal samples so as to provide a group of nn series of downstream optical signal samples having the optical signal samples in each series of downstream optical signal samples in the group carried over $\lambda_T$ at a respective one of the data rates $DRT_1, \ldots, DRT_{nn}$, and a downstream wavelength converter unit operatively associated with the demultiplexer and operative to convert $\lambda_T$ of all except one of the series of downstream optical signal samples in the group into the channel wavelengths $\lambda_1, \ldots, \lambda_{nn-1}$ so as to provide the nn series of downstream optical signal samples having the downstream optical signal samples carried over the channel wavelengths $\lambda_1, \ldots, \lambda_{nn-1}, \lambda_T$ at the respective data rates $DRT_1, \ldots, DRT_{nn}$.

In accordance with a preferred embodiment of the present invention there is also provided an optical switching apparatus that switches to a destination route upstream optical signal samples that are obtained from a first source by a spread spectrum technique, and upstream optical signal samples that are obtained from additional NCC sources and include at least one of the following: upstream optical signal samples that are separately obtained from NS sources by the spread spectrum technique, and n series of upstream optical signal samples that are separately obtained from n sources and are carried over n discrete channel wavelengths, wherein the upstream optical signal samples obtained from the first source are provided at a data rate DRS, the upstream optical signal samples obtained from the NS sources are provided at data rates $DRSS_j$, and each series of upstream optical signal samples in the n series of upstream optical signal samples is carried over a discrete channel wavelength $\lambda_i$ at a data rate $DR_i$, where each of NCC, n and NS is an integer greater than or equal to one, i is an index running from 1 to n, and j is an index running from 1 to NS, the apparatus including an upstream optical converter unit operative to convert the upstream optical signal samples that are obtained from the first source and the upstream optical signal samples that are obtained from the additional NCC sources into a broadband combined series of upstream optical signal samples at a combined data rate $DR_c$ which is greater than any of the following: DRS, any separate $DRSS_j$, and any separate $DR_i$, and an upstream router operatively associated with the upstream optical converter unit and operative to route the broadband combined series of upstream optical signal samples to the destination route.

Preferably, each of the upstream optical signal samples obtained from the first source and the upstream optical signal samples obtained from the NS sources includes upstream optical signal samples that occupy a wavelength band, and the upstream optical converter unit includes a multiplexing/demultiplexing unit including: a grouped add-drop multiplexer (GADM) which is operative to drop the upstream optical signal samples obtained from the first source, and at least one of the following: NS grouped ADMs operative to drop the upstream optical signal samples that are separately obtained from the NS sources, and at least one ADM operative to drop the n series of upstream optical signal samples, an upstream wavelength converter unit operatively associated with the multiplexing/demultiplexing unit and including: a broadband wavelength converter operatively associated with the GADM and operative to convert the upstream optical signal samples obtained from the first source that are dropped by the GADM into a first series of upstream optical signal samples centered around a channel wavelength $\lambda_D$, and at least one of the following: NS broadband wavelength converters operatively associated with the NS grouped ADMs and operative to convert the dropped upstream optical signal samples that are separately obtained from the NS sources into NS series of upstream optical signal samples centered around the channel wavelength $\lambda_D$, and at least one wavelength converter operative to convert any of the $\lambda_i$ that differ from $\lambda_D$ to $\lambda_D$ thereby forming a group of n series of upstream optical signal samples having the upstream optical signal samples carried over $\lambda_D$, and a combiner operatively associated with the upstream wavelength converter unit and operative to obtain the broadband combined series of upstream optical signal samples by combining the following: all the series of upstream optical signal samples centered around the channel wavelength $\lambda_D$, and the n series of upstream optical signal samples in the group.

Alternatively, each of the upstream optical signal samples obtained from the first source and the upstream optical signal samples obtained from the NS sources includes upstream optical signal samples that are randomly spread in a plurality of bands around a plurality of wavelengths, and the upstream optical converter unit includes a multiplexing/demultiplexing unit including: a random add-drop multiplexer (RADM) which is operative to drop the upstream optical signal samples obtained from the first source, and at least one of the following: NS random ADMs operative to drop the upstream optical signal samples that are separately obtained from the NS sources, and at least one ADM operative to drop the n series of upstream optical signal samples, an upstream wavelength converter unit operatively associated with the multiplexing/demultiplexing unit and including: a broadband wavelength converter operatively associated with the RADM and operative to convert the upstream optical signal samples obtained from the first source that are dropped by the RADM into a first broadband series of upstream optical signal samples, and at least one of the following: NS broadband wavelength converters operatively associated with the NS random ADMs and operative to convert the dropped upstream optical signal samples that are separately obtained from the NS sources into NS broadband series of upstream optical signal samples, and at least one wavelength converter operative to convert any of the $\lambda_i$ to a channel wavelength $\lambda_D$ thereby forming a group of n series of upstream optical signal samples having the upstream optical signal samples carried over $\lambda_D$, and a combiner operatively associated with the upstream wavelength converter unit and operative to obtain the broadband combined series of upstream optical signal samples by combining the following: the first broadband series of upstream optical signal samples, the NS broadband series of upstream optical signal samples, and the n series of upstream optical signal samples in the group.

Further in accordance with a preferred embodiment of the present invention there is also provided an optical switching apparatus that switches to nn routes a broadband series of downstream optical signal samples obtained by utilizing a spread spectrum technique, where nn is an integer greater than one and the broadband series of downstream optical signal samples is provided at a data rate $DR_T$, the apparatus including a downstream optical converter unit operative to convert the broadband series of downstream optical signal samples into nn series of downstream optical signal samples at data rates $DRT_1, \ldots, DRT_{nn}$, the nn series of downstream optical signal samples including at least one of the following: NT broadband series of downstream optical signal samples, and NST series of downstream optical signal samples having the downstream optical signal samples carried over discrete channel wavelengths, where each of nn, NT and NST is an integer greater than or equal to one, and each of $DRT_1, \ldots, DRT_{nn}$ is less than $DR_T$, and a downstream router operatively associated with the downstream optical converter unit and operative to route the nn series of downstream optical signal samples to the nn routes respectively.

Preferably, the broadband series of downstream optical signal samples obtained by utilizing a spread spectrum technique includes downstream optical signal samples that occupy a wavelength band, and the downstream optical converter unit includes a demultiplexer operative to separate the broadband series of downstream optical signal samples into nn series of downstream optical signal samples including at least one of the following: NT broadband series of downstream optical signal samples centered around a channel wavelength $\lambda_T$, and NST series of downstream optical signal samples each having the downstream optical signal samples carried over $\lambda_T$, a downstream wavelength converter unit operatively associated with the demultiplexer and including at least one of the following: NT broadband wavelength converters operative to convert the NT broadband series of downstream optical signal samples centered around $\lambda_T$ into NT broadband series of downstream optical signal samples centered around NT channel wavelengths of which NT−1 channel wavelengths are different from $\lambda_T$, and at least one wavelength converter operative to convert the NST series of downstream optical signal samples into NST series of downstream optical signal samples having the downstream optical signal samples carried over NST channel wavelengths of which NST−1 channel wavelengths are different from $\lambda_T$, and a multiplexing/demultiplexing unit including at least one of the following: NT grouped add-drop multiplexers (GADMs) operative to add the NT broadband series of downstream optical signal samples centered around NT channel wavelengths to NT routes of the nn routes respectively, and NST add-drop multiplexers operative to add the NST series of downstream optical signal samples carried over the NST channel wavelengths to NST routes of the nn routes respectively.

Alternatively, the broadband series of downstream optical signal samples obtained by utilizing a spread spectrum technique includes downstream optical signal samples that are randomly spread in a plurality of bands around a plurality of wavelengths, and the downstream optical converter unit includes a demultiplexer operative to separate the broadband series of downstream optical signal samples into nn series of downstream optical signal samples including at least one of the following: NT broadband series of downstream optical signal samples, and NST series of downstream optical signal samples each having the downstream optical signal samples carried over $\lambda_T$, a downstream wavelength converter unit operatively associated with the demultiplexer and including at least one of the following: NT broadband wavelength converters operative to convert the NT broadband series of downstream optical signal samples into NT broadband series of downstream optical signal samples randomly spread in a plurality of bands around a plurality of wavelengths, and at least one wavelength converter operative to convert the NST series of downstream optical signal samples into NST series of downstream optical signal samples having the downstream optical signal samples carried over NST channel wavelengths of which NST−1 channel wavelengths are different from $\lambda_T$, and a multiplexing/demultiplexing unit including at least one of the following: NT random add-drop multiplexers (RADMs) operative to add the NT broadband series of downstream optical signal samples randomly spread in a plurality of bands around a plurality of wavelengths to NT routes out of the nn routes respectively, and NST add-drop multiplexers operative to add the NST series of downstream optical signal samples carried over the NST channel wavelengths to NST routes out of the nn routes respectively.

Still further in accordance with a preferred embodiment of the present invention there is also provided an optical communication signal useful for communication to at least one of a node server and an end node of an optical communication network, the optical communication signal including a broadband series of optical signal samples having the optical signal samples carried at a data rate $DR_c$, the broadband series of optical signal samples being produced by optically converting optical signal samples that are obtained from a first source by a spread spectrum technique, and optical signal samples that are obtained from additional NCC sources and include at least one of the following: optical signal samples that are separately obtained from NS out of the NCC sources by the spread spectrum technique, and n series of optical signal samples that are separately obtained from n out of the NCC sources and are carried over n discrete channel wavelengths, wherein the optical signal samples obtained from the first source are provided at a data rate DRS, the optical signal samples obtained from the NS sources are provided at data rates $DRSS_j$, and each series of optical signal samples in the n series of optical signal samples has the optical signal samples carried at a data rate $DR_i$, where each of NCC, n and NS is an integer greater than or equal to one, i is an index running from 1 to n, and j is an index running from 1 to NS, and $DR_c$ is greater than any of the following: DRS, any separate $DRSS_j$, and any separate $DR_i$.

The optical switching apparatus of the present invention, in any configuration mentioned above, may preferably be embodied in a communication switch of a communication network that includes a node server and a plurality of end nodes, and may preferably be operatively associated with the node server and the plurality of end nodes.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
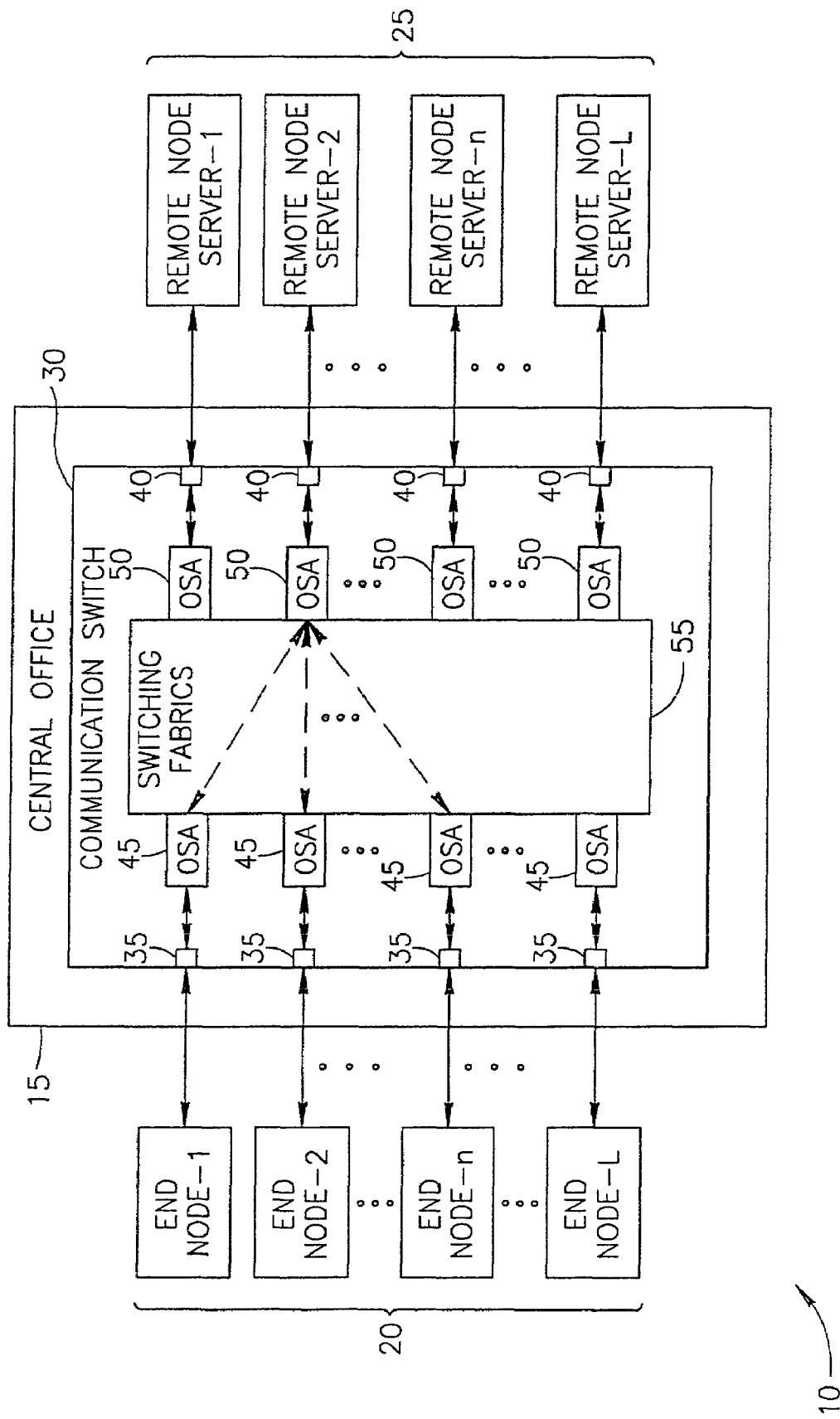
FIG. 1 is a simplified block diagram illustration of a preferred implementation of an optical communication network, the optical communication network being constructed and operative in accordance with a preferred embodiment of the present invention.

Reference is now made to FIG. 1 which is a simplified block diagram illustration of a preferred implementation of an optical communication network 10, the optical communication network 10 being constructed and operative in accordance with a preferred embodiment of the present invention.

The optical communication network 10 preferably includes a plurality of node servers that communicate, preferably in two-way communication, with a plurality of end nodes.

The term "node server" is used throughout the specification and claims to include a network element at a branch or a node of a communication network which concentrates, switches and/or routes information transmitted from other branches of the communication network that are associated with it. The term "end node" is used throughout the specification and claims to include a network element at a branch or a node of a communication network that communicates with other network elements via a node server.

It is appreciated that node servers and end nodes may be located at various branches or nodes of an optical communication network. Referring, for example, to a communication path between an information provider unit and a subscriber terminal, the information provider unit is a node server to the subscriber terminal, and the subscriber terminal is an end node to the information provider unit. If communication between the information provider unit and the subscriber terminal is provided via an intermediate element of the optical communication network, for example an optical network unit (ONU), then the ONU is an end node to the information provider unit, and a node server to the subscriber terminal. Similarly, in a multi-stage communication network in which communication between the information provider unit and the subscriber terminal is provided via a series of intermediate elements, an intermediate element at any stage is a node server for intermediate elements at lower stages, and an end node for intermediate elements at higher stages.

In a communication system that forms part of an optical data storage system, a node server may include a concentrator that concentrates data communicated in wired or wireless communication from one of the following: a storage media; a plurality of optical data sources; and optical data conveyors. The storage media, the plurality of optical data sources and the optical data conveyors are end nodes to the concentrator.

Typically, a node server may communicate with a single end node or with a plurality of end nodes, and with other node servers. An end node may communicate with a single node server or with a plurality of node servers, and with other end nodes via one or more node servers. It is appreciated that the present invention is not limited by the number of end nodes that communicate with a single node server, or by the number of node servers that communicate with a single end node.

In the embodiment shown in FIG. 1, a central office (CO) 15 of the optical communication network 10 is a node server that preferably communicates in two-way optical communication with a plurality of end nodes 20 and a plurality of node servers 25. The plurality of end nodes 20 include, for example, L end nodes 20, and the plurality of node servers 25 include, for example, L node servers 25 that are located away from the CO 15, where L is an integer greater than one. The CO 15 preferably includes a communication switch 30 that is operative to switch and route optical information communicated via the switch 30 in the following way: from the L end nodes 20 to the L node servers 25 and vice versa; from some end nodes 20 to other end nodes 20; and from some node servers 25 to other node servers 25.

The switch 30 may preferably include an L×L optical switch having L input ports 35 and L output ports 40. Each of the input ports 35 is preferably operatively associated with one of the L end nodes 20 and with an optical switching apparatus (OSA) 45. Each of the output ports 40 is preferably operatively associated with one of the L node servers 25 and with an optical switching apparatus (OSA) 50 that may be similar in structure and functionality to the OSA 45. Each of the OSAs 45 and the OSAs 50 is preferably operatively associated with switching fabrics 55 that may include, for example, an optical cross-connect (not shown) as is well known in the art, for example, from the article entitled "Optical switching promises cure for telecommunications logjam", by Jeff Hecht, Laser Focus World, September 1998 that is mentioned above. It is appreciated that the OSAs 45 and 50 may alternatively or additionally be comprised in the switching fabrics 55.

The operation of the optical communication network 10 of FIG. 1 is now briefly described. Preferably, the switch 30 switches and routes optical information communicated by the end nodes 20 and the node servers 25. Each of the end nodes 20 and each of the node servers 25 may preferably communicate the optical information over one channel wavelength or over a plurality of channel wavelengths, for example, in a wavelength division multiplexed form.

In conventional optical switching, optical information received at, for example, one of the input ports 35 is switched to one of the output ports 40. In a preferred embodiment of the present invention each of the OSAs 45 and the OSAs 50 is preferably capable of combining optical information from a plurality of ports, such as a plurality of input ports 35 or a plurality of output ports 40. The OSAs 45 and the OSAs 50 are also preferably capable of routing combined optical information in a suitable format to a single port, such as a single output port 40 or a single input port 35. Additionally or alternatively, each of the OSAs 45 and the OSAs 50 is capable of separating optical information received at a single port and distributing separated optical information to a plurality of ports in a suitable format, Accordingly, the OSAs 45 the OSAs 50 enable the switch 30 to speedup or slowdown optical information passing through the switch 30.

It is appreciated that the OSAs 45 and 50 need not necessarily be comprised in the switch 30. In a case where the switch 30 is a conventional switch with no speedup or slowdown functionality, the OSAs 45 and 50 may provide, for example, pre-switching combination of optical information before it is inputted to the switch 30, or post-switching combination of optical information outputted by the switch 30.

It is appreciated that although communication speedup is known in communication networks that communicate electronic data signals, that is communication networks operating in the electronic domain, speedup in optical communication networks that operate in the optical domain to transmit optical signals is not trivial. The present invention however provides for speedup and slow-down of optical communication in all-optical networks. The term "all-optical network" is used throughout the specification and claims to include an optical communication network in which switching operations requiring conversions from the optical domain to the electronic domain and vice versa are avoided, at least to a certain extent.

Figure 2:
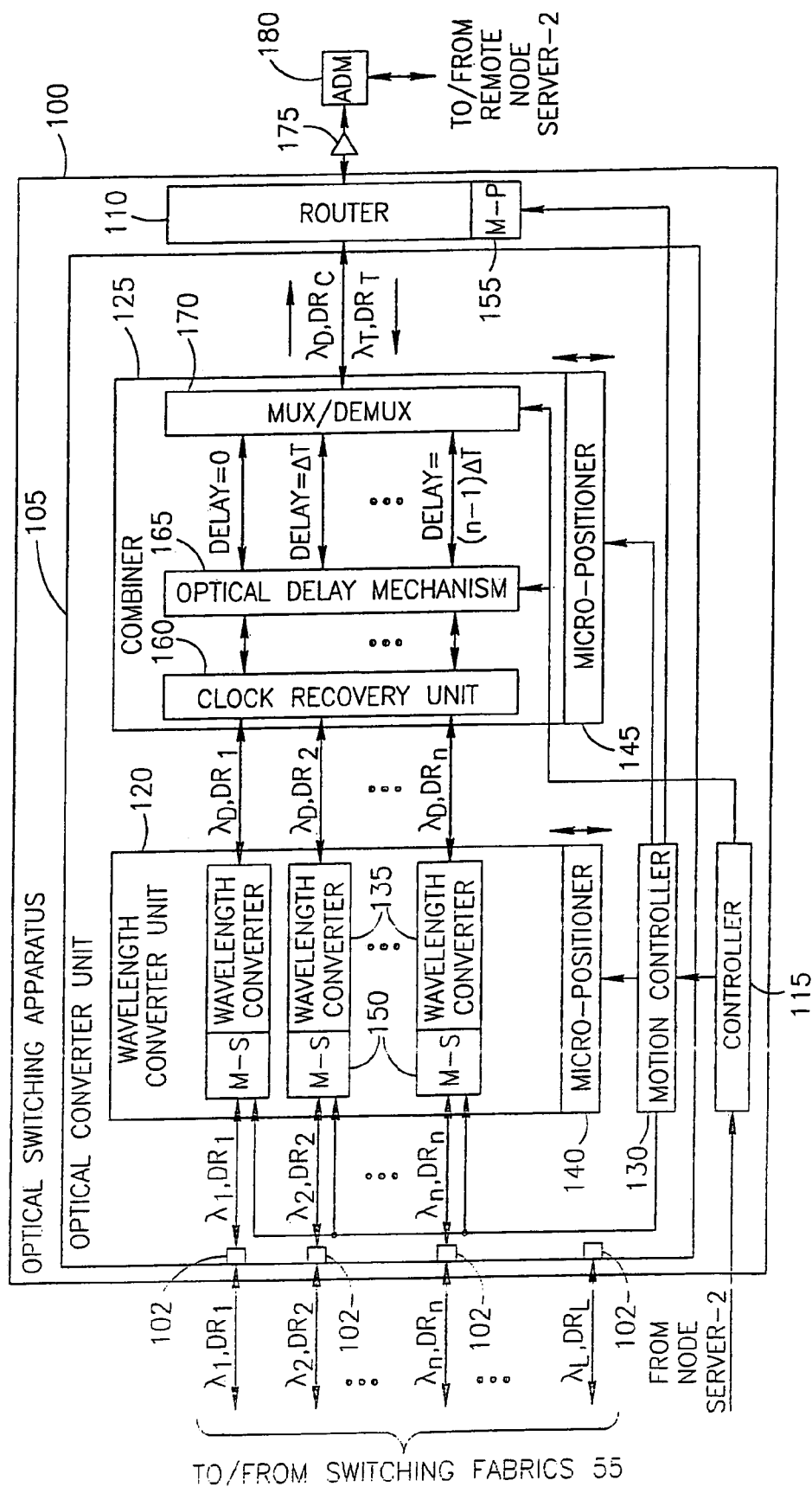
FIG. 2 is a simplified block diagram illustration of a preferred implementation of an optical switching apparatus in the optical communication network of FIG. 1, the optical switching apparatus being constructed and operative in accordance with a preferred embodiment of the present invention.

Reference is now additionally made to FIG. 2 which is a simplified block diagram illustration of a preferred implementation of one of the OSAs 45 and 50 in the optical communication network 10 of FIG. 1. For simplicity, the description below refers to one of the OSAs 50 shown in FIG. 1 to be operatively associated with one of the plurality of remote node servers 25 that is indicated as remote node server-2. The OSA 50 that is shown in FIG. 1 to be operatively associated with the remote node server-2 is referred to in FIG. 2 as optical switching apparatus 100.

It is appreciated that the present invention is not limited by referring to the optical switching apparatus 100 and its association with the remote node server-2 because, as mentioned above, all the OSAs 45 and 50 are similar in structure and functionality.

The remote node server-2 may be, for example a CO (not shown) located in a city (not shown) away from the CO 15, and both the remote node server-2 and the CO 15 may form part of a metropolitan area network (MAN) (not shown). The optical switching apparatus 100 in the CO 15 may then interface to the MAN and enable the CO 15 to communicate with the remote node server-2 via the MAN.

The optical switching apparatus 100 preferably switches and routes optical signal samples communicated in a direction upstream and in a direction downstream. The term "upstream" is used throughout the specification and claims to refer to a direction of communication towards one of the plurality of node servers 25, such as towards the remote node server-2. The term "downstream" is used throughout the specification and claims to refer to a direction of communication towards one of the plurality of end nodes 20. Thus, for example, upstream communication may include transmission of optical information from some of the end nodes 20 to the remote node server-2 as well as transmission of optical information from remote node servers 25 other than the remote node server-2 to the remote node server-2 via the switch 30. Downstream communication may include, for example, transmission of optical information from the remote node server-2 to some of the end nodes 20 as well as transmission of optical information from one of the end nodes 20 to other end nodes 20 via the switch 30.

The optical signal samples switched and routed by the optical switching apparatus 100 may be either analog optical signals or digital optical signals that represent optical information. If the optical signal samples are digital optical signals, each optical signal sample typically includes a bit. Preferably, the optical signal samples are coded in a return-to-zero (RZ) line code with adjacent optical signal samples being spaced by time spacing T. However, it is appreciated that the optical signal samples may alternatively be coded in other line codes as described below.

Referring for example, to communication in the upstream, the optical switching apparatus 100 may preferably receive n series of upstream optical signal samples, where n is an integer greater than one. Each series of upstream optical signal samples in the n series of upstream optical signal samples is preferably carried over a channel wavelength $\lambda_i$ at a data rate $DR_i$, where i is an index running from 1 to n. It is appreciated that each series of upstream optical signal samples in the n series of upstream optical signal samples may carry optical signal samples in an optical time-division multiplexed form.

The optical switching apparatus 100 may preferably include L ports 102 and the n series of upstream optical signal samples are preferably received at the optical switching apparatus 100 via n of the L ports 102. Preferably, the n series of upstream optical signal samples received via the n ports 102 are provided to an optical converter unit 105 that is preferably comprised in the optical switching apparatus 100. It is appreciated that the optical converter unit 105 may preferably operate as an upstream optical converter unit for upstream communication as well as a downstream optical converter unit for downstream communication.

The optical converter unit 105 is preferably operative to convert the n series of upstream optical signal samples into a combined series of upstream optical signal samples having the upstream optical signal samples carried over a channel wavelength $\lambda_D$ at a combined data rate $DR_c$ which is greater than any separate $DR_i$. The channel wavelength $\lambda_D$ is preferably a channel wavelength that is useful for carrying optical signal samples to a destination route. The destination route, which preferably guides the optical signal samples, for example, to the remote node server-2, may include one of the following communication media: a fiber optic cable capable of carrying optical signal samples at the combined data rate $DR_c$; a wireless communication route; a waveguide other than a fiber optic cable; a transmission line, an interface to an optical transceiver, and an interface to an optical communication system operating at the combined data rate $DR_c$. The term "transceiver" is used throughout the specification and claims to include a transmitter and a receiver, preferably combined together.

Preferably, the optical converter unit 105 provides the combined series of upstream optical signal samples to a router 110 that is also preferably comprised in the optical switching apparatus 100. The router 110 is preferably operative to route the combined series of upstream optical signal samples to the destination route at the combined data rate $DR_c$. It is appreciated that $DR_c$ may preferably be equal to $\Sigma_{i=1,\ldots,n} DR_i$ or similar to $\Sigma_{i=1,\ldots,n} DR_i$.

Preferably, the optical switching apparatus 100 may also include a controller 115 that is operatively associated with the optical converter unit 105 and is operative to determine the number of series n converted by the optical converter unit 105 and combined in the combined series of upstream optical signal samples. It is appreciated that the controller 115 may be also operative to select the channel wavelength $\lambda_D$, preferably from $\lambda_1, \ldots, \lambda_n$ and optionally, in response to an instruction received, for example, from the remote node server-2.

The optical converter unit 105 may preferably include a wavelength converter unit 120, a combiner 125 and a motion controller 130. The wavelength converter unit 120 preferably includes a plurality of wavelength converters 135. Preferably, conversion of the n series of upstream optical signal samples into the combined series of upstream optical signal samples having the upstream optical signal samples carried over a channel wavelength $\lambda_D$ at a combined data rate $DR_c$ is performed by the optical converter unit 105 as follows: the plurality of wavelength converters 135, that receive the n series of upstream optical signal samples provided via the n ports, preferably convert any channel wavelength $\lambda_i$ that differs from $\lambda_D$ to $\lambda_D$ thereby forming a group of n series of upstream optical signal samples having the upstream optical signal samples carried over $\lambda_D$.

Preferably, the wavelength converter unit 120 provides the group of n series of upstream optical signal samples having the upstream optical signal samples carried over $\lambda_D$ to the combiner 125 which is operative to combine the n series of upstream optical signal samples in the group so as to provide the combined series of upstream optical signal samples having the upstream optical signal samples carried over $\lambda_D$ at the combined data rate $DR_c$ that is provided by the router 110 to the destination route.

The motion controller 130 is preferably operative to control motion of the wavelength converter unit 120 and the combiner 125. Motion backward or forward of the wavelength converter unit 120 and the combiner 125 is preferably provided by micro-positioners (M-Ps) 140 and 145 that are preferably coupled to the wavelength converter unit 120 and combiner 125 respectively. The micro-positioners 140 and 145 are preferably operative to move the wavelength converter unit 120 and the combiner 125 in synchronization under control of the motion controller 130.

It is appreciated that the controller 115 may also have the functionality of the motion controller 130 in which case the motion controller 130 is optional.

Preferably, each of the plurality of wavelength converters 135 may be associated with an ON/OFF switch, such as a mechanical switch (M-S) 150. When an M-S 150 is in the "ON" state, the M-S 150 passes optical signal samples to a wavelength converter unit 135 associated therewith. When the M-S 150 is in the "OFF" state, passage of optical signal samples to the wavelength converter 135 that is associated with the M-S 150 is blocked. Preferably, the motion controller 130 is also operative to control operation of the M-Ss 150.

The router 110 may preferably be coupled to a micro-positioner 155 that is operative to move the router 110 backward or forward. The motion controller 130 is preferably operatively associated with the micro-positioner 155 and is operative to control the micro-positioner 155. The router 110 is preferably moved in synchronization with the wavelength converter unit 120 and the combiner 125.

It is appreciated that motion of the wavelength converter unit 120, the combiner 125 and the router 110 and operation of the M-Ss 150 may be required in various applications. For example, in a pre-switching or a post-switching application, the wavelength converter unit 120 and the combiner 125 may be moved backward or forward in order to receive series of optical signal samples from different end nodes 20.

Furthermore, the optical switching apparatus 100 may be required to combine different numbers of series of optical signal samples depending on the capacity of the remote node server 25 that is associated with the optical switching apparatus 100. In such a case, selection of the number n of series of optical signal samples to be combined by the optical switching apparatus 100 may be performed by programming the motion controller 130 to provide a suitable combination of M-Ss 150 in ON states that allow passage of series of upstream optical signal samples and M-Ss 150 in OFF states that block passage of series of upstream optical signal samples. The programming of the motion controller 130 may be performed, for example, in response to an indication received from the remote node server 25 that is associated with the optical switching apparatus 100.

The combiner 125 may preferably include a clock-recovery unit 160, an optical delay mechanism 165 and a multiplexer/demultiplexer (MUX/DEMUX) 170. The clock-recovery unit 160 is preferably operative to receive the group of n series of upstream optical signal samples having the upstream optical signal samples carried over $\lambda_D$ from the wavelength converters 135 and to recover a clock signal $CLK_i$ for each series of optical signal samples in the group.

Preferably, the clock-recovery unit 160 is operative to perform all-optical clock recovery for each of the series in the group. An example of a system that performs all-optical clock recovery is a system described in the above-mentioned article of Wang et al that performs all-optical clock recovery based on AM mode-locking of a fiber ring laser. Another example of a system that performs all-optical clock recovery is a system described in the above-mentioned article of Kawanishi et al that performs all-optical clock recovery based on a phase-locked-loop (PLL). It is appreciated that the clock-recovery unit 160 may include more than one of the systems of Wang et al or Kawanishi et al in order to recover the clock signals of all the series in the group.

Once the clock signals of the series of upstream optical signal samples in the group have been recovered by the clock recovery unit 160, the optical delay mechanism 165, which is preferably operatively associated with the clock-recovery unit 160, may generate time delays of at least a fraction of the time spacing T between every two series of upstream optical signal samples in the group so as to create a group of n sequentially delayed series of upstream optical signal samples in which a delay between every two series of upstream optical signal samples is at least a fraction of T.

The optical delay mechanism 165 may include, for example, a plurality of delay generators which delay optical signals without using optical-to-electronic and electronic-to-optical conversions as described in copending U.S. patent application Ser. No. 09/389,345 filed on Sep. 3, 1999. The optical delay mechanism 165 may use, for example, a signal phase discriminator (not shown) to sense phase variations among the series of optical signal samples, and the controller 115, or a controller comprised in the optical delay mechanism 165 (not shown), may select, based on sensed phase variations among the series of optical signal samples, those of the plurality of delay generators to be used by the optical delay mechanism 165 so as to ultimately provide the time delays, for example, in the form of the following series of time delays: 0, $\Delta T$, $2\Delta T$, $3\Delta T$, . . . , $(n-1) \Delta T$, where $\Delta T$ is the fraction of T.

Alternatively, the optical delay mechanism 165 may generate the time delays using, for example, a delay line setup as described in the above-mentioned article of Klovekorn et al or arrangements that use a nonlinear optical loop mirror (NOLM) as described in the above-mentioned articles of Hall et al.

The optical delay mechanism 165 preferably provides the group of n sequentially delayed series of upstream optical signal samples to the MUX/DEMUX 170. The MUX/DEMUX 170 may include, for example, a passive star coupler (not shown) that multiplexes the n sequentially delayed series of upstream optical signal samples in the group so as to provide the combined series of upstream optical signal samples which is provided to the router 110 and fed by the router 110 to the destination route. It is appreciated that due to the delays among the series of upstream optical signal samples provided to the MUX/DEMUX 170, multiplexing by the MUX/DEMUX 170 ultimately results in a combined series of upstream optical signal samples having the upstream optical signal samples multiplexed by optical time-division multiplexing (OTDM).

It is appreciated that the combined series of upstream optical signal samples may be amplified by an optical amplifier 175, such as an Erbium-doped-fiber-amplifier (EDFA) for wavelengths around 1550 nanometer (nm), before feeding to the destination route. The optical amplifier 175 may be comprised in the optical switching apparatus 100 or associated therewith. It is appreciated that optical amplifiers (not shown) may also be operatively associated with the wavelength converters 135 and the clock-recovery unit 160 for amplifying signals emanating therefrom.

Preferably, in order to prevent overlapping of the optical signal samples multiplexed by the MUX/DEMUX 170, ΔT must be less than T minus WD, where WD is a characteristic duration of an optical signal sample in the n series of upstream optical signal samples. Additionally or alternatively, the highest delay between any two series of upstream optical signal samples in the group of n sequentially delayed series of upstream optical signal samples should not exceed T minus WD. It is appreciated that the ratio T/WD, which is preferably computed by the controller 115, determines the number n of series of upstream optical signal samples that can be combined in the combined series of upstream optical samples. The controller 115 preferably determines n to be the highest integer that satisfies the inequality n<T/WD.

In a case where $DR_1 = \ldots = DR_n$, the controller 115 may select delay generators or delay line setups to provide a series of time delays growing by a constant step, such as the series of time delays 0, ΔT, 2ΔT, 3ΔT, . . . , (n−1) ΔT mentioned above. In such a case, the MUX/DEMUX 170 may include a synchronous time-division multiplexer which is operative to synchronously time-division multiplex the n sequentially delayed series of upstream optical signal samples in the group so as to provide the combined series of upstream optical signal samples.

In a case where at least some of the data rates $DR_1, \ldots, DR_n$ are different from each other, the controller 115 may select delay generators or delay line setups to provide a series of variably growing time delays. In such a case, the MUX/DEMUX 170 may include an asynchronous time-division multiplexer which is operative to asynchronously time-division multiplex the n sequentially delayed series of upstream optical signal samples in the group so as to provide the combined series of upstream optical signal samples. However, since at least some of the data rates $DR_1, \ldots, DR_n$ are different from each other, at least some of the n series of upstream optical signal samples have different time spacing between samples, and therefore the asynchronous time-division multiplexer determines the delay between every two series of upstream optical signal samples and creates the group of n sequentially delayed series of upstream optical signal samples.

It is appreciated that at least the multiplexer portion of the MUX/DEMUX 170, the router 110 and the destination route may be comprised in a single element. For example, in a case where the optical switching apparatus 100 communicates with the remote node server-2 via a fiber optic cable (not shown), a star coupler (not shown) may be used as a combination of the multiplexer portion of the MUX/DEMUX 170, the router 110 and the destination route since a fused fiber portion of the star coupler that is coupled to n ports of the star coupler may form part of all of the following: the multiplexer portion of the MUX/DEMMUX 170, the router 110 and the destination route.

The destination route may be operatively associated with an add/drop multiplexer (ADM) 180. The ADM 180 is preferably operative to multiplex by wavelength division multiplexing (WDM) the upstream optical signal samples in the combined series of upstream optical signal samples having the upstream optical signal samples carried over $\lambda_D$ at the combined data rate $DR_c$ with optical signal samples multiplexed by WDM that may be provided to the ADM 180, for example, from OSAs 50 other than the optical switching apparatus 100 or from other information sources (not shown) external to the CO 15. It is appreciated that the ADM 180 may preferably be separated from the optical switching apparatus 100 or alternatively embodied in the router 110 and associated with the destination route.

The term "wavelength division multiplexing" or "WDM" is used throughout the specification and claims in a broad sense to include wavelength division multiplexing of optical signals carried over a plurality of channel wavelengths within any suitable wavelength range. Specifically, WDM is used throughout the specification and claims to include wavelength division multiplexing of optical signals carried over two channel wavelengths, wavelength division multiplexing of optical signals carried over more than two and up to tens of channel wavelengths for which the term "dense WDM" (DWDM) is typically used, and wavelength division multiplexing of optical signals carried over tens to hundreds of channel wavelengths for which the term "optical frequency division multiplexing" (OFDM) is typically used. Channel wavelengths typically used for WDM include wavelengths in bands of the order of tens nm around each of the following wavelengths: 780 nm; 980 nm; 1310 nm; 1480 nm; 1550 nm; and 1620 nm. It is appreciated that optical signals carried over channel wavelengths in different wavelength bands may also be multiplexed by WDM.

Referring now to communication in the downstream, the ADM 180 may preferably drop a series of downstream optical signal samples carried over a channel wavelength $\lambda_T$ at a data rate $DR_T$ that is communicated by the remote node server-2 to the optical switching apparatus 100. It is appreciated that the series of downstream optical signal samples may be carried over the channel wavelength $\lambda_T$ in a time-division multiplexed form.

Preferably, the optical switching apparatus 100 may receive the series of downstream optical signal samples at the router 110 after amplification by the optical amplifier 175. The router 110 preferably provides the series of downstream optical signal samples to the optical converter unit 105 which is preferably operative to convert the series of downstream optical signal samples into nn series of downstream optical signal samples having the downstream optical signal samples carried over channel wavelengths $\lambda_1, \ldots, \lambda_{nn-1}, \lambda_T$ at data rates $DRT_1, \ldots, DRT_{nn}$ respectively, where nn is an integer greater than one, $\lambda_1 \# \lambda_T, \ldots, \lambda_{nn-1} \# \lambda_T$ and each of $DRT_1, \ldots, DRT_{nn}$ is less than $DR_T$. It is appreciated that $DRT_1, \ldots, DRT_{nn}$ are determined so as to preferably satisfy the equality $\Sigma_{i=1, \ldots, nn} DRT_i = DR_T$ or so that $\Sigma_{i=1, \ldots, nn} DRT_i$ is similar to $DR_T$.

Preferably, the optical converter unit 105 provides the nn series of downstream optical signal samples having the downstream optical signal samples carried over the channel wavelengths $\lambda_1, \ldots, \lambda_{nn-1}, \lambda_T$ at the data rates $DRT_1, \ldots, DRT_{nn}$ to the switching fabrics 55 which functions, for this purpose, as a router that routes the nn series of downstream optical signal samples to nn appropriate destinations, such as nn of the L end nodes 20.

It is appreciated that in symmetric communication applications $DRT_i = DR_n$ for corresponding downstream and upstream series of optical signal samples. In asymmetric communication applications $DRT_i \# DR_i$ for at least some of the corresponding downstream and upstream series of optical signal samples.

The number nn of series of downstream optical signal samples may preferably be determined by the controller 115, and selected, for example, by the controller 115 instructing the motion controller 130 to provide a suitable combination of M-Ss 150 in ON states and M-Ss 150 in OFF states. The controller 115 may additionally be operative to select the channel wavelengths $\lambda_1, \ldots, \lambda_{nn-1}$ prior to conversion of the series of downstream optical signal samples into the nn series of downstream optical signal samples.

Preferably, conversion of the series of downstream optical signal samples into the nn series of downstream optical signal samples is performed by the optical converter unit 105 as follows: the MUX/DEMUX 170 preferably performs optical time-division demultiplexing of the series of downstream optical signal samples so as to provide a group of nn series of downstream optical signal samples, each having the optical signal samples carried over $\lambda_T$ at a corresponding one of the data rates $DRT_1, \ldots, DRT_{nn}$. The group of nn series of optical signal samples is then provided to the wavelength converter unit 120.

At the wavelength converter unit 120, the wavelength converters 135 preferably convert $\lambda_T$ of all except one of the series of downstream optical signal samples in the group into the channel wavelengths $\lambda_1, \ldots, \lambda_{nn-1}$ so as to provide the nn series of downstream optical signal samples having the downstream optical signal samples carried over the channel wavelengths $\lambda_1, \ldots, \lambda_{nn-1}, \lambda_T$ at the respective data rates $DRT_1, \ldots, DRT_{nn}$. Then, the wavelength converters 135 provide the nn series of downstream optical signal samples having the downstream optical signal samples carried over the channel wavelengths $\lambda_1, \ldots, \lambda_{nn-1}, \lambda_T$ at the data rates $DRT_1, \ldots, DRT_{nn}$ to the switching fabrics 55.

For the purpose of performing optical time-division demultiplexing of the series of downstream optical signal samples even, for example, at data rates of the order of tens Gbit/sec, the demultiplexer portion of the MUX/DEMUX 170 may include a setup as described, for example, in the article of Ellis et al with different switching windows for each series of downstream optical signal samples in the group. Alternative setups that may be suitable for the demultiplexer portion of the MUX/DEMUX 170 are described in the above mentioned articles of Eiselt et al and Patrick et al. It is appreciated that the setups of Ellis et al, Eiselt et al and Patrick et al use built-in setups for clock-recovery and for creating tunable switching windows in which case the clock-recovery unit 160 and the optical delay mechanism 165 do not participate in downstream communication and are only passed.

In a case where the MUX/DEMUX 170 includes a synchronous time-division demultiplexer which performs synchronous optical time-division demultiplexing of the series of downstream optical signal samples, the resulting data rates $DRT_1, \ldots, DRT_{nn}$ of the nn series of downstream optical signal samples are equal. In a case where the MUX/DEMUX 170 includes an asynchronous time-division demultiplexer which performs asynchronous optical time-division demultiplexing of the series of downstream optical signal samples, at least some of the resulting data rates $DRT_1, \ldots, DRT_{nn}$ of the nn series of downstream optical signal samples are not equal.

The operation of the apparatus of FIG. 2 is now briefly described by referring, without limiting the present invention, to an example in which four end nodes 20 communicate simultaneously with the remote node server-2 via the optical switching apparatus 100.

In communication in a direction upstream, four series of upstream optical signal samples originating from the four end nodes 20 and carried over channel wavelengths $\lambda_1, \lambda_2, \lambda_3, \lambda_4$ at data rates $DR_1, DR_2, DR_3,$ and $DR_4$ respectively are provided by the switching fabrics 55 to the optical switching apparatus 100. Each of the data rates $DR_1, DR_2, DR_3,$ and $DR_4$ may be, for example, equal to 2.5 Gbit/sec. The optical signal samples in each of the four series of upstream optical signal samples are preferably multiplexed by OTDM, and each of the four series of upstream optical signal samples is preferably coded in an RZ line code with adjacent optical signal samples being spaced by a time spacing T.

At the optical switching apparatus 100, the controller 115 preferably selects the channel wavelength $\lambda_D$ to be, for example, $\lambda_1$. Then, the wavelength converters 135 preferably convert each of the channel wavelengths $\lambda_2, \lambda_3, \lambda_4$ into $\lambda_1$ thereby forming a group of four series of upstream optical signal samples having the upstream optical signal samples carried over $\lambda_1$.

Preferably, the group of four series of upstream optical signal samples having the upstream optical signal samples carried over $\lambda_1$ is provided to the combiner 125. At the combiner 125, the clock signals for the four series of upstream optical signal samples are preferably recovered and time delays of T/4, T/2 and 3T/4 are preferably respectively generated among the series of upstream optical signal samples in the group so as to form a group of four sequentially delayed series of upstream optical signals having the upstream optical signal samples carried over $\lambda_1$.

The four sequentially delayed series of upstream optical signal samples in the group are preferably time-division multiplexed, in this case synchronously, thereby providing a combined series of upstream optical signal samples which carries optical signal samples over the channel wavelength $\lambda_1$ at a combined data rate of 10 Gbit/sec. The combined series of upstream optical signal samples may be routed via the destination route, for example, to the remote node server-2.

It is thus appreciated that the operation of the optical switching apparatus 100 resulted in a speedup of optical communication in the upstream by a factor of four. Such speedup may be required, for example, in a case where the end nodes 20 and the remote node servers 25 communicate with the CO 15 at different data rates. This may occur, for example, when the remote node servers 25 and the end nodes 20 include different generations of communication hardware.

In communication in a direction downstream, the optical switching apparatus 100 receives from the remote node server-2 a series of downstream optical signal samples that are carried, for example, over a channel wavelength $\lambda_T = \lambda_1$ at a data rate $DR_T = 10$ Gbit/sec. The series of downstream optical signal samples is preferably provided to the combiner 125.

At the combiner 125, one of the techniques mentioned above for performing time-division demultiplexing of the series of downstream optical signal samples may be used to recover the clock signal of the series of downstream optical signal samples and to apply different switching windows so as to obtain, for example by synchronous time-division demultiplexing, nn=4 series of downstream optical signal samples, each having the optical signal samples carried at 2.5 Gbit/sec over $\lambda_1$.

The four series of downstream optical signal samples having the optical signal samples carried at 2.5 Gbit/sec over $\lambda_1$ are then provided to the wavelength converter unit 120 in which the channel wavelengths $\lambda_1$ of three of the four series of downstream optical signal samples are preferably converted into $\lambda_2, \lambda_3, \lambda_4$ respectively so as to ultimately provide four series of downstream optical signal samples having the downstream optical signal samples carried over the channel wavelengths $\lambda_1, \lambda_2, \lambda_3$ and $\lambda_4$ at data rates $DRT_1, DRT_2, DRT_3$ and $DRT_4$, where $DRT_1 = DRT_2 = DRT_3 = DRT_4 = 2.5$ Gbit/sec.

The four series of downstream optical signal samples having the downstream optical signal samples carried over the channel wavelengths $\lambda_1$, $\lambda_2$, $\lambda_3$ and $\lambda_4$ at the data rates $DRT_1$, $DRT_2$, $DRT_3$ and $DRT_4$ may then be provided to the switching fabrics 55. The switching fabrics 55 may route the four series of downstream optical signal samples having the downstream optical signal samples carried over the channel wavelengths $\lambda_1$, $\lambda_2$, $\lambda_3$ and $\lambda_4$ at the data rates $DRT_1$, $DRT_2$, $DRT_3$ and $DRT_4$ to the four end nodes 20 respectively. It is thus appreciated that the operation of the optical switching apparatus 100 resulted in a slow-down of optical communication in the downstream by a factor of four.

Figure 3:
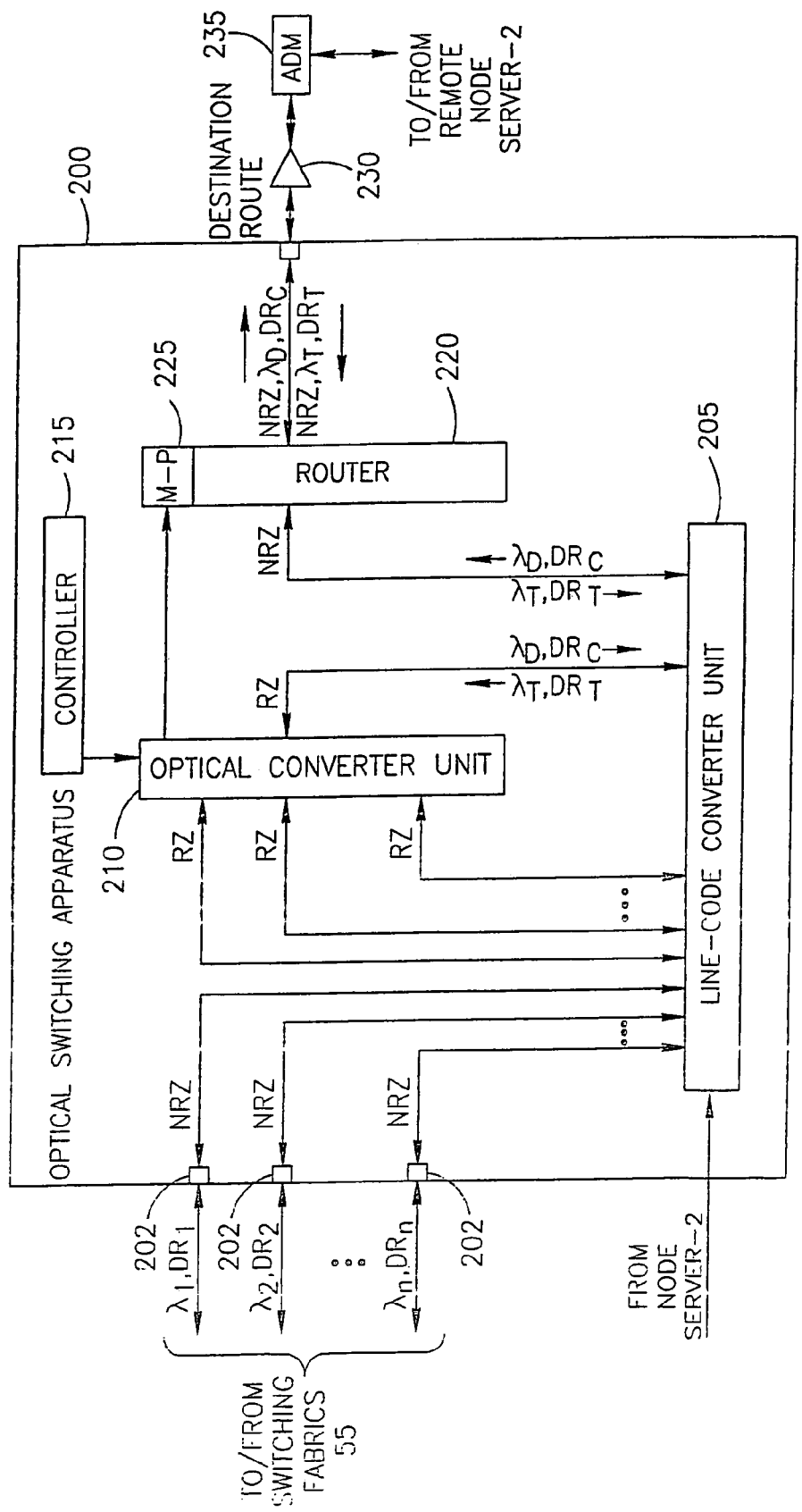
FIG. 3 is a simplified block diagram illustration of another preferred implementation of an optical switching apparatus in the optical communication network of FIG. 1.

Reference is now made to FIG. 3 which is a simplified block diagram illustration of a preferred implementation of an optical switching apparatus 200 in the optical communication network 10 of FIG. 1. The optical switching apparatus 200 may preferably replace the optical switching apparatus 100 of FIG. 2 in applications in which optical signal samples communicated to and from the optical switching apparatus 200 are coded in a line code other than an RZ line code. The line code other than an RZ line code may be, for example, a non-return-to zero (NRZ) line code.

Referring for example to communication in the upstream, the optical switching apparatus 200 may preferably receive n series of NRZ coded upstream optical signal samples via ports 202, where n is an integer. Each of the n series of NRZ coded upstream optical signal samples is preferably carried over a channel wavelength $\lambda_i$ at a data rate $DR_i$, where i is an index running from 1 to n.

Preferably, the n series of NRZ coded upstream optical signal samples are provided to a line code converter unit 205 that is operatively associated with the optical switching apparatus 200 and may also be comprised in the optical switching apparatus 200. The line code converter unit 205 is preferably operative to convert the n series of NRZ coded upstream optical signal samples into n series of RZ coded upstream optical signal samples.

In its simplest form, the line converter unit 205 may include a conventional transceiver of RZ coded optical signal samples (not shown) that is operatively associated with a conventional transceiver of NRZ coded optical signal samples (not shown). For conversion of optical signal samples from an NRZ line code to an RZ line code, NRZ coded optical signal samples, that are received and decoded at the receiver portion of the transceiver of NRZ coded optical signal samples, are encoded in an RZ line code and transmitted by the transmitter portion of the transceiver of RZ coded optical signal samples. For conversion of optical signal samples from an RZ line code to an NRZ line code, RZ coded optical signal samples, that are received and decoded at the receiver portion of the transceiver of RZ coded optical signal samples, are encoded in an NRZ line code and transmitted by the transmitter portion of the transceiver of NRZ coded optical signal samples.

It is appreciated that the line code converter unit 205 may receive indications of the type of the line code other than an RZ line code to be used from the remote node server-2 of FIG. 1 and apply transceivers of optical signal samples coded in corresponding line codes as necessary.

Preferably, the n series of RZ coded upstream optical signal samples are provided to an optical converter unit 210 that may be similar in structure and functionality to the optical converter unit 105 of FIG. 2. At the optical converter unit 210, the n series of RZ coded upstream optical signal samples are converted into a combined series of RZ coded upstream optical signal samples having the upstream optical signal samples carried over a channel wavelength $\lambda_D$ at a combined data rate $DR_c$ in a manner as mentioned above with reference to FIG. 2. It is appreciated that the optical converter unit 210 may be controlled by a controller 215 that may be similar in structure and functionality to the controller 115 of FIG. 2.

Preferably, the optical converter unit 210 provides the combined series of RZ coded upstream optical signal samples back to the line code converter unit 205 which preferably converts the combined series of RZ coded upstream optical signal samples into a combined series of NRZ coded upstream optical signal samples. Then, the line code converter unit 205 preferably provides the combined series of NRZ coded upstream optical signal samples to a router 220 that may be similar in structure and functionality to the router 110 of FIG. 2 and may similarly be moved by a micro-positioner (M-P) 225 that may be controlled via the optical converter unit 210. The router 220 may preferably route the combined series of NRZ coded upstream optical signal samples to a destination route which preferably provides the combined series of NRZ coded upstream optical signal samples to an ADM 235, preferably after amplification by an optical amplifier 230.

The ADM 235 may preferably be similar in structure and functionality to the ADM 180 of FIG. 2. The ADM 235 is preferably operative to multiplex by WDM the NRZ coded upstream optical signal samples in the combined series of NRZ coded upstream optical signal samples with optical signal samples multiplexed by WDM that may be provided to the ADM 235, for example, from information sources (not shown) external to the optical switching apparatus 200. The output of the ADM 235 is preferably provided to the remote node server-2 of FIG. 1. It is appreciated that the ADM 235 is preferably separated from the optical switching apparatus 200 or alternatively embodied in the router 220 and associated with the destination route.

In a direction downstream, a series of NRZ coded downstream optical signal samples carried over a channel wavelength $\lambda_T$ at a data rate $DR_T$ that is transmitted from the remote node server-2 of FIG. 1 is preferably dropped by the ADM 235, amplified by the optical amplifier 230, and provided to the line code converter unit 205 via the router 220. The line code converter unit 205 preferably converts the series of NRZ coded downstream optical signal samples into a series of RZ coded downstream optical signal samples that is preferably separated, in the optical converter unit 210, so as to provide nn series of RZ coded downstream optical signal samples having the downstream optical signal samples carried over channel wavelengths $\lambda_1, \ldots, \lambda_{nn-1}, \lambda_T$ at data rates $DRT_1, \ldots, DRT_{nn}$ in a manner as mentioned above with reference to FIG. 2. The nn series of RZ coded downstream optical signal samples are then provided to the line code converter unit 205 which preferably converts the nn series of RZ coded downstream optical signal samples into nn series of NRZ coded downstream optical signal samples. The nn series of NRZ coded downstream optical signal samples are then preferably routed, for example, to the switching fabrics 55 of FIG. 1.

Figure 4:
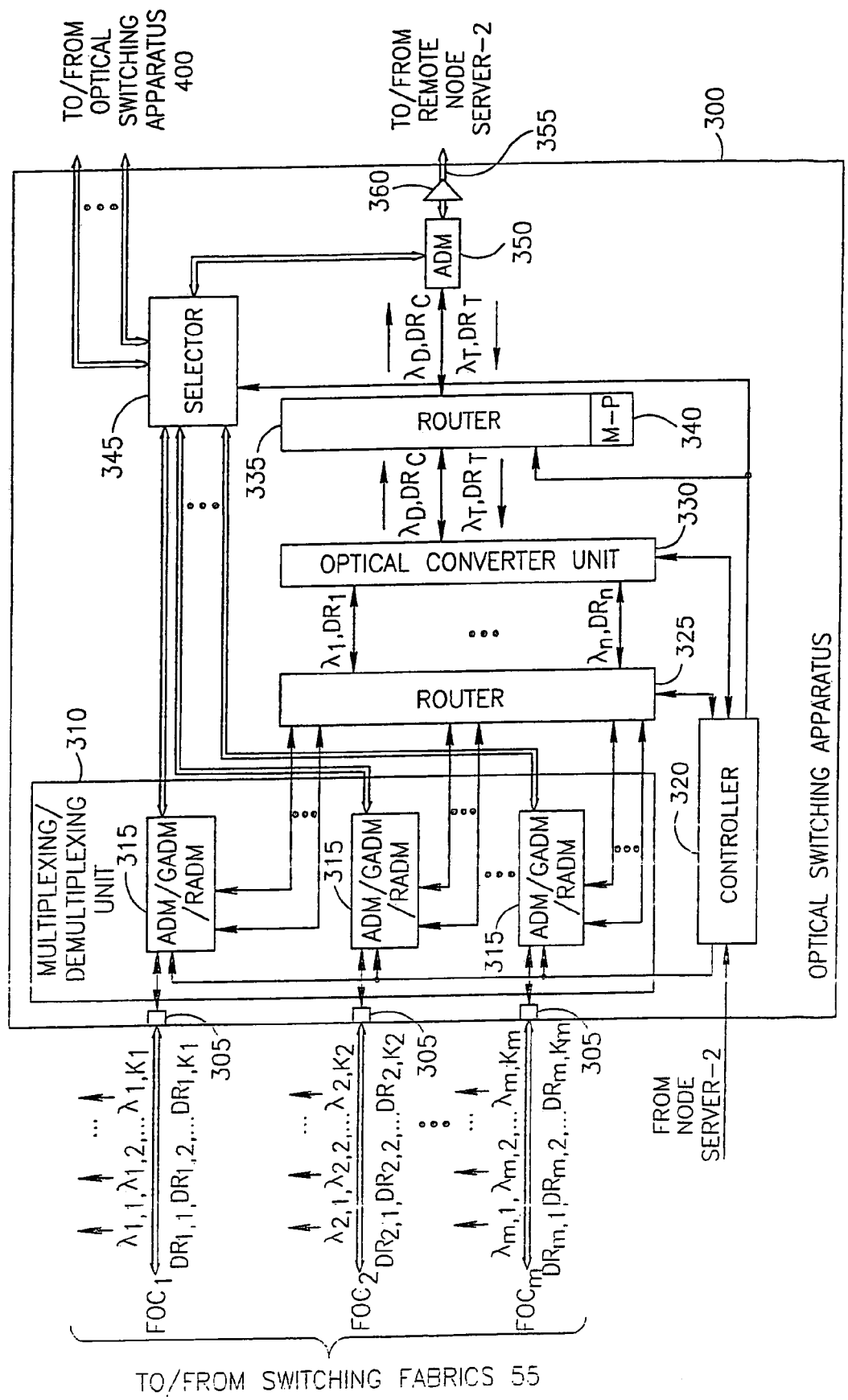
FIG. 4 is a simplified block diagram illustration of yet another preferred implementation of an optical switching apparatus in the optical communication network of FIG. 1.

Reference is now made to FIG. 4 which is a simplified block diagram illustration of a preferred implementation of an optical switching apparatus 300 in the optical communication network 10 of FIG. 1. The optical switching apparatus 300 may preferably replace the optical switching apparatus 100 of FIG. 2 in applications in which optical signal samples communicated to and from the optical switching apparatus 300 are provided in a wavelength division multiplexed form.

Referring for example to communication in the upstream, the optical switching apparatus 300 may preferably receive at ports 305 a plurality of series of upstream optical signal samples. The plurality of series of upstream optical signal samples are preferably received from the switching fabrics 55 of FIG. 1 via separate waveguides, such as via m separate fiber optic cables $FOC_1$, $FOC_2$, ..., $FOC_m$, where m is an integer greater than or equal to 1. Preferably, the fiber optic cables $FOC_1$, $FOC_2$, ..., $FOC_m$ carry groups of $k_1$, ..., $k_m$ series of upstream optical signal samples respectively, preferably in a wavelength division multiplexed form over channel wavelengths $\{\lambda_{ii,jj}\}$ at data rates $\{DR_{ii,jj}\}$ respectively, where $k_1$, ..., $k_m$ are integers greater than one, ii is an index running from 1 to m, and jj is an index running from 1 to $k_j$ where j is an index running from 1 to m.

Preferably, the plurality of series of optical signal samples received at the ports 305 are provided to a multiplexing/demultiplexing unit 310 in the optical switching apparatus 300 that may preferably be a WDM multiplexing/demultiplexing unit. The multiplexing/demultiplexing unit 310 may include one ADM 315 or a plurality of ADMs 315. Alternatively, the multiplexing/demultiplexing unit 310 may include one wavelength division multiplexer/demultiplexer such as a star coupler/decoupler (not shown) or a plurality of wavelength division multiplexers/demultiplexers (not shown).

The multiplexing/demultiplexing unit 310 is preferably operatively associated with a controller 320 and a router 325 that are preferably comprised in the optical switching apparatus 300. The controller 320 and the router 325 are also preferably operatively associated with an optical converter unit 330 that may also be comprised in the optical switching apparatus 300 and may be similar in structure and functionality to the optical converter unit 105 of FIG. 2. The optical converter unit 330 is also preferably operatively associated with a router 335 and a micro-positioner 340 associated with router 335. The router 335 and the micro-positioner 340 may be comprised in the optical switching apparatus 300 and may be similar in structure and functionality to the router 110 and the micro-positioner 155 of FIG. 2 respectively.

Preferably, the controller 320 may be operative to control operation of the ADMs 315 in the multiplexing/demultiplexing unit 310, the router 325 and the optical converter unit 330. It is appreciated that the controller 320 may receive inputs from the remote node server-2 of FIG. 1 and control operation of the ADMs 315, the router 325 and the optical converter unit 330 based, for example, on the inputs received from the remote node server-2 of FIG. 1. Alternatively, the controller may be pre-programmed or programmed to operate independently of the remote node server-2.

It is appreciated that the controller 320 may also have the functionality of a controller (not shown) in the optical converter unit 330 that corresponds to the controller 115 of FIG. 2 in which case the controller in the optical converter unit 330 is optional.

Preferably, the controller 320 is operative to select n series of upstream optical signal samples from the groups of $k_1$, ..., $k_m$ series of upstream optical signal samples. The controller 320 may select the n series of upstream optical signal samples, for example, from a group of series of upstream optical signal samples carried over one of the fiber optic cables $FOC_1$, $FOC_2$, ..., $FOC_m$ or from a plurality of groups of series of upstream optical signal samples carried over a plurality of the fiber optic cables $FOC_1$, $FOC_2$, ..., $FOC_m$ respectively. It is appreciated that the number n of series of upstream optical signal samples may be selected, for example, in accordance with a capacity of the remote node server-2.

Preferably, based on a selection of n series of upstream optical signal samples performed by the controller 320, the ADMs 315 drop the n series of upstream optical signal samples selected by the controller 320 from those of the in separate fiber optic cables $FOC_1$, $FOC_2$, ..., $FOC_m$ that carry the selected n series of upstream optical signal samples.

It is appreciated that in a case where the multiplexing/demultiplexing unit 310 includes wavelength division multiplexer/demultiplexers, the n series of upstream optical signal samples may be separated by demultiplexing at least some of the $k_1$, ..., $k_m$ series of upstream optical signal samples in the groups of $k_1$, ..., $k_m$ series of upstream optical signal samples so as to provide LK demultiplexed series of upstream optical signal samples, where LK is an integer greater than one and less than or equal to $k_1 + ... + k_m$, and selecting each of the n series of upstream optical signal samples from the LK demultiplexed series of upstream optical signal samples.

The n series of upstream optical signal samples dropped or separated by the multiplexing/demultiplexing unit 310 are preferably provided to the router 325 which preferably arranges and routes the n series of upstream optical signal samples to n ports (not shown) of the optical converter unit 330. The optical converter unit 330 and the router 335 preferably operate in a manner as mentioned above with reference to FIG. 2 to combine the n series of upstream optical signal samples, using OTDM, so as to provide, at the output of the router 335, a combined series of upstream optical signal samples having the upstream optical signal samples carried over a channel wavelength $\lambda_D$ at a combined data rate $DR_c$. The router 335 preferably provides the combined series of upstream optical signal samples to an ADM 350 that may be comprised in the optical switching apparatus 300 or external to the optical switching apparatus 300 and operatively associated therewith.

Preferably, series of upstream optical signal samples that are not provided to the router 325 are provided, for example over at least some of the m separate fiber optic cables $FOC_1$, $FOC_2$, ..., $FOC_m$, to a selector 345 that may be comprised in the optical switching apparatus 300 and controlled by the controller 320. The selector 345 may include, for example, a mechanical switch (not shown) that selects one of the fiber optic cables $FOC_1$, $FOC_2$, ..., $FOC_m$ under control of the controller 320 and outputs series of upstream optical signal samples that are carried over a selected fiber optic cable to the ADM 350, and series of upstream optical signal samples that are carried over non-selected fiber optic cables to a separate optical switching apparatus 400 (not shown) that may be similar in structure and functionality to the optical switching apparatus 300. The optical switching apparatus 400 may operate together with the optical switching apparatus 300 in a cascaded form as described below.

The ADM 350 preferably employs WDM to add the combined series of upstream optical signal samples having the upstream optical signal samples carried over $\lambda_D$ to series of upstream optical signal samples that are carried over the fiber optic cable selected by the selector 345 in a wavelength division multiplexed form thereby generating a combined series of upstream optical signal samples, combined by both OTDM and WDM. Then, the ADM 350 transmits the combined series of upstream optical signal samples, combined by both OTDM and WDM, to the remote node server-2 of FIG. 1 via a destination fiber optic cable 355, preferably after amplification by an optical amplifier 360.

In a direction downstream, a group of series of downstream optical signal samples multiplexed by WDM that is transmitted from the remote node server-2 of FIG. 1 is preferably received at the ADM 350 in the optical switching apparatus 300. It is appreciated that each series of downstream optical signal samples in the group may carry the optical signal samples at a data rate $DR_T$.

Preferably, the ADM 350 separates a series of downstream optical signal samples carried over a channel wavelength $\lambda_T$ at the data rate $DR_T$ from the group and provides the separated series of downstream optical signal samples to the router 335. The ADM 350 also preferably provides the rest of the series of downstream optical signal samples in the group, that are carried over channel wavelengths other than $\lambda_T$, to the selector 345.

The selector 345 preferably provides the series of downstream optical signal samples received thereat to at least one of the ADMs 315 selected by the controller 320, for example the ADM 315 that is operatively associated with the fiber optic cable $FOC_2$. The router 335 preferably provides the series of downstream optical signal samples carried over the channel wavelength $\lambda_T$ at the data rate $DR_T$ to the optical converter unit 330. The optical converter unit 330 preferably separates, in a manner as mentioned above with reference to FIG. 2, the series of downstream optical signal samples carried over the channel wavelength $\lambda_T$ at the data rate $DR_T$ so as to provide nn series of downstream optical signal samples having the downstream optical signal samples carried over channel wavelengths $\lambda_1, \ldots, \lambda_{nn-1}, \lambda_T$ at data rates $DRT_1, \ldots, DRT_{nn}$.

Then, in accordance with a selection performed by the controller 320, the nn series of downstream optical signal samples are preferably provided to nn ADMs 315 including, for example, the ADM 315 that is operatively associated with the fiber optic cable $FOC_2$. The ADM 315 that is operatively associated with the fiber optic cable $FOC_2$ preferably adds, using WDM, a corresponding one of the nn series of downstream optical signal samples to the series of downstream optical signal samples provided thereto by the selector 345 and routes outputted series of upstream optical signal samples multiplexed by WDM to the fiber optic cable $FOC_2$. The other nn–1 ADMs 315 may, for example, route the nn–1 corresponding series of downstream optical signal samples to the fiber optic cables $FOC_1, FOC_3, \ldots, FOC_{nn}$ respectively.

It is thus appreciated that by employing the optical switching apparatus 300, series of downstream optical signal samples multiplexed by WDM may be separated and recombined to provide, for example, various distributions in which the same fiber optic cable may carry series of downstream optical signal samples at different data rates.

The operation of the apparatus of FIG. 4 is now briefly described by referring, without limiting the present invention, to a few examples.

In a first example, the optical switching apparatus 300 may receive eight series of upstream optical signal samples for routing to the node server-2. A first fiber optic cable $FOC_1$ preferably carries four of the eight series of upstream optical signal samples to the optical switching apparatus 300 in a wavelength division multiplexed form over channel wavelengths $\lambda_1, \lambda_2, \lambda_3$ and $\lambda_4$ at corresponding data rates $DR_1, DR_2, DR_3$ and $DR_4$, where $DR_1=DR_2=DR_3=DR_4=2.5$ Gbit/sec. A second fiber optic cable $FOC_2$ preferably carries the other four series of upstream optical signal samples to the optical switching apparatus 300 in a wavelength division multiplexed form over channel wavelengths $\lambda_5, \lambda_6, \lambda_7$ and $\lambda_8$ at corresponding data rates $DR_5, DR_6, DR_7$ and $DR_8$ where $DR_5=DR_6=DR_7=DR_8=2.5$ Gbit/sec.

The upstream series of optical signal samples carried over $FOC_1$ and $FOC_2$ can be combined by using WDM, as is well known in the art, so as to provide eight series of upstream optical signal samples multiplexed by WDM and carried over $\lambda_1, \ldots, \lambda_8$ at corresponding data rates $DR_1, \ldots, DR_8$, where $DR_1= \ldots =DR_8=2.5$ Gbit/sec.

However, the remote node server-2 may include, for example, equipment that can communicate with the optical switching apparatus 300 at a higher data rate over each channel wavelength, such as at 10 Gbit/sec, but can allot less channel wavelengths for communication with the optical switching apparatus 300, for example five channel wavelengths. In such a case, the optical switching apparatus 300 may perform, under control of the controller 320, a combination using OTDM in the optical converter unit 330 of the four series of upstream optical signal samples carried over $\lambda_1, \lambda_2, \lambda_3$ and $\lambda_4$ so as to provide a combined series of upstream optical signal samples having the optical signal samples carried over $\lambda_1$ at a data rate $DR_c$, where $DR_c=10$ Gbit/sec.

The other four series of upstream optical signal samples carried over $\lambda_5, \lambda_6, \lambda_7$ and $\lambda_8$ may preferably be provided unchanged, via the multiplexing/demultiplexing unit 310 and the selector 345, to the ADM 350. The ADM 350 may use WDM to add the combined series of upstream optical signal samples having the optical signal samples carried over $\lambda_1$ to the four series of upstream optical signal samples carried over $\lambda_5, \lambda_6, \lambda_7$ and $\lambda_8$ so as to provide five series of upstream optical signal samples multiplexed by WDM and carried over $\lambda_1, \lambda_5, \lambda_6, \lambda_7$ and $\lambda_8$, where the series of upstream optical signal samples carried over $\lambda_1$ is carried at 10 Gbit/sec, and each of the other four series of upstream optical signal samples is carried at 2.5 Gbit/sec. The five series of upstream optical signal samples are preferably routed to the remote node server-2.

It is appreciated that the optical switching apparatus 300 may perform alternative combinations of the eight series of upstream optical signal samples received thereat depending, for example, on criteria and constraints received from the remote node server-2 or determined by the controller 320.

One type of criteria and constraints that may be determined by the controller 320 may include, for example, occurrence of interference effects among different channel wavelengths. Referring, for example, to a case where interference effects occur between the channel wavelengths $\lambda_2$ and $\lambda_6$, conventional WDM of the eight channel wavelengths $\lambda_1, \ldots, \lambda_8$ in such a case is not desirable. However, when the optical switching apparatus 300 is used to provide the five series of upstream optical signal samples multiplexed by WDM and carried over $\lambda_1, \lambda_5, \lambda_6, _7$ and $\lambda_8$, such interference effects are avoided.

In a second example, the optical switching apparatus 300 also receives eight series of upstream optical signal samples for routing to the node server-2, but the eight series of upstream optical signal samples are provided at different data rates. A first fiber optic cable $FOC_1$ preferably carries four of the eight series of upstream optical signal samples to the optical switching apparatus 300 in a wavelength division multiplexed form over channel wavelengths $\lambda_1, \lambda_2, \lambda_3$ and $\lambda_4$ at corresponding data rates $DR_1, DR_2, DR_3$ and $DR_4$, where $DR_1=DR_3=10$ Gbit/sec and $DR_2=DR_4=2.5$ Gbit/sec. A second fiber optic cable $FOC_2$ preferably carries the other four series of upstream optical signal samples to the optical switching apparatus 300 in a wavelength division multiplexed form over channel wavelengths $\lambda_5, \lambda_6, \lambda_7$ and $\lambda_8$ at corresponding data rates $DR_5, DR_6, DR_7$ and $DR_8$, where $DR_5=DR_7=10$ Gbit/sec and $DR_6=DR_8=2.5$ Gbit/sec.

The optical switching apparatus 300 may preferably perform, under control of the controller 320, a combination using OTDM in the optical converter unit 330 of the series of upstream optical signal samples carried over $\lambda_2$, $\lambda_4$, $\lambda_6$ and $\lambda_8$ so as to provide a combined series of upstream optical signal samples having the optical signal samples carried at a data rate $DR_c$=10 Gbit/sec, for example over $\lambda_2$. The combined series of upstream optical signal samples may then be provided to the ADM 350.

The series of upstream optical signal samples carried over $\lambda_1$, $\lambda_3$, $\lambda_5$ and $\lambda_7$ may preferably be provided unchanged, via the multiplexing/demultiplexing unit 310 and the selector 345, to the ADM 350. The ADM 350 preferably combines the series of upstream optical signal samples carried over $\lambda_1$, $\lambda_3$ $\lambda_5$ and $\lambda_7$ with the combined series of upstream optical signal samples having the optical signal samples carried over $\lambda_2$ by using WDM so as to transmit to the remote node server-2 five series of upstream optical signal samples having the upstream optical signal samples carried over $\lambda_1$, $\lambda_2$, $\lambda_3$, $\lambda_5$ and $\lambda_7$ at similar data rates of 10 Gbit/sec.

In a third example, series of upstream optical signal samples may be combined in a plurality of combination stages by employing the optical switching apparatus 300 in a cascaded form together with the optical switching apparatus 400 or a plurality thereof In each stage, the controller 320 or a corresponding controller (not shown) in one of the plurality of optical switching apparatus 400 may determine the series of upstream optical signal samples to be combined and whether to perform combination by utilizing OTDM and/or WDM.

It is appreciated that in each of the examples mentioned above, series of downstream optical signals that are transmitted in a direction downstream are separated by utilizing WDM and/or OTDM in accordance with selections made by the controller 320 and under control of the controller 320.

A fourth example refers to a case where at least one of the fiber optic cables $FOC_1$, $FOC_2$, ..., $FOC_m$, such as $FOC_1$, carries upstream optical signal samples that are obtained by a spread spectrum technique such as an optical code division multiple access (OCDMA) technique.

It is appreciated that the rest of the fiber optic cables $FOC_2$, ..., $FOC_m$ may preferably carry upstream optical signal samples that are obtained from NCC sources and include at least one of the following: upstream optical signal samples that are separately obtained from NS out of the NCC sources by the spread spectrum technique; and n series of upstream optical signal samples that are separately obtained from n out of the NCC sources and are carried over n discrete channel wavelengths, where each of NCC, n and NS is an integer greater than one. Thus, in such a configuration, upstream optical signal samples that can be switched to the remote node server-2 may include either a combination of upstream optical signal samples that are obtained by a spread spectrum technique and upstream optical signal samples that are separately obtained from n out of the NCC sources and are carried over n discrete channel wavelengths, or only upstream optical signal samples that are obtained by a spread spectrum technique.

Preferably, the upstream optical signal samples obtained by the spread spectrum technique and carried over $FOC_1$ are provided at a data rate DRS. The upstream optical signal samples obtained from the NS sources are provided at data rates $DRSS_j$, and each series of upstream optical signal samples in the n series of upstream optical signal samples is carried over a discrete channel wavelength $\lambda_i$ at a data rate $DR_i$, where i is an index running from 1 to n, and j is an index running from 1 to NS. It is appreciated that DRS, each of $DRSS_j$, and each of $DR_i$ may, for example, be different.

In the present example, $FOC_1$ carries upstream optical signal samples that occupy a wavelength band between $\lambda_1$ and $\lambda_3$ and are centered at $\lambda_2$ at a data rate DRS=10 Gbit/sec, and upstream optical signal samples that are carried over discrete channel wavelengths $\lambda_4$ and $\lambda_5$ at corresponding data rates $DR_4$ and $DR_5$, where $DR_4$=$DR_5$=2.5 Gbit/sec. It is appreciated that DRS, and similarly each of $DRSS_j$, result from the spreading performed in the OCDMA technique of lower data rate optical signal samples.

Further in the present example, the second fiber optic cable $FOC_2$ carries two series of upstream optical signal samples over discrete channel wavelengths $\lambda_6$ and $\lambda_7$ at corresponding data rates $DR_6$ and $DR_7$, where $DR_6$=$DR_7$=2.5 Gbit/sec. It is appreciated that each of the fiber optic cables $FOC_1$ and $FOC_2$ carries the upstream optical signal samples in a wavelength division multiplexed form. In the present example, the fiber optic cables $FOC_3$, ..., $FOC_m$ do not carry upstream optical signal samples.

In such a case, at least one of the ADMs 315 in the multiplexing/demultiplexing unit 310, such as the ADM 315 that is operatively associated with the fiber optic cable $FOC_1$, preferably includes a grouped ADM (GADM). The GADM is preferably operative to drop optical signal samples that occupy a wavelength band, and also, when combined with a conventional ADM, optical signal samples that are carried over discrete channel wavelengths. In the present example, the GADM may drop, for example, the upstream optical signal samples spread between $\lambda_1$ and $\lambda_3$ and centered at $\lambda_2$, and the upstream optical signal samples carried over $\lambda_4$. The two series of upstream optical signal samples carried by $FOC_2$ over the discrete channel wavelengths $\lambda_6$ and $\lambda_7$ may also be dropped by another ADM 315.

It is appreciated that in a case where upstream optical signal samples are separately obtained from the NS sources by the spread spectrum technique, NS GADMs are typically required to respectively drop the upstream optical signal samples that are separately obtained from the NS sources.

The upstream optical signal samples at the output of the GADM, as well as the series of upstream optical signal samples carried over the discrete channel wavelengths $\lambda_4$, $\lambda_6$ and $\lambda_7$, are preferably provided to the optical converter unit 330 via the router 325. The optical converter unit 330 converts, for example the series of upstream optical signal samples carried over the discrete channel wavelengths $\lambda_4$, $\lambda_6$, into series of upstream optical signal samples carried over $\lambda_7$ in a manner as mentioned above with reference to FIG. 2.

The upstream optical signal samples at the output of the GADM may preferably be converted in the optical converter unit 330 into a series of upstream optical signal samples centered around $\lambda_7$ by a broadband wavelength converter that may replace a corresponding one of the wavelength converters 135 of FIG. 2. Then, all of the series of upstream optical signal samples carried over $\lambda_7$ and the series of upstream optical signal samples centered around $\lambda_7$ may be combined by the optical converter unit 330 to obtain a broadband combined series of upstream optical signal samples centered around $\lambda_7$ at a combined data rate $DR_c$ in a manner as mentioned above with reference to FIG. 2. It is appreciated that $DR_c$ is greater than any one of the following: DRS; $DR_4$; and $DR_5$.

In a case where upstream optical signal samples are separately obtained from the NS sources by the spread spectrum technique, NS broadband wavelength converters are typically required to respectively convert wavelengths of NS series of upstream optical signal samples that are dropped by the NS GADMs. After wavelength conversion, the NS series of upstream optical signal samples may also be combined to provide another broadband series of upstream optical signal samples centered around $\lambda_7$.

The only difference between the broadband combined series of upstream optical signal samples centered around $\lambda_7$ of the present example and a combined series of upstream optical signal samples carried over $\lambda_7$ that results from combining series of upstream optical signal samples that are carried only over discrete channel wavelengths, is that the broadband combined series of upstream optical signal samples centered around $\lambda_7$ occupies a broader band around $\lambda_7$ than a band occupied by the combined series of upstream optical signal samples that results from combining series of upstream optical signal samples that are carried only over discrete channel wavelengths. It is appreciated that the broader band occupied by the combined series of upstream optical signal samples centered around $\lambda_7$ may however limit the number of channel wavelengths that the ADM 350 can multiplex by WDM.

In communication in a direction downstream, a demultiplexer portion of the optical converter unit 330, corresponding to the demultiplexer portion of the MUX/DEMUX 170 mentioned above with reference to FIG. 2, separates a broadband series of downstream optical signal samples obtained by utilizing a spread spectrum technique into nn series of downstream optical signal samples at data rates $DRT_1, \ldots, DRT_{nn}$. The nn series of downstream optical signal samples include at least one of the following: NT broadband series of downstream optical signal samples that occupy a wavelength band; and NST series of downstream optical signal samples having the downstream optical signal samples carried over discrete channel wavelengths, where each of nn, NT and NST is an integer greater than or equal to one, and each of $DRT_1, \ldots, DRT_{nn}$ is less than $DR_T$.

The GADM preferably receives broadband series of downstream optical signal samples converted by the optical converter unit 330, and also converted series of downstream optical signal samples carried over discrete channel wavelengths as necessary, and adds the corresponding series of downstream optical signal samples to $FOC_1$. An ADM 315 being operatively associated with $FOC_2$ adds appropriate series of downstream optical signal samples to $FOC_2$.

It is appreciated that the optical converter unit 330 may convert both broadband optical signal samples that occupy, for example, a wavelength band between $\lambda_1$ and $\lambda_3$ and a series of upstream optical signal samples carried over a discrete channel wavelength in the range $\lambda_1$ and $\lambda_3$ because the signals carried over the discrete channel wavelength and the broadband signals may still be separated in conventional optical receivers that have good signal energy resolution.

In a variation of the fourth example, $FOC_1$ may carry upstream or downstream optical signal samples that are randomly spread in a plurality of bands around a plurality of wavelengths, such as in separate bands around $\lambda_1$ and $\lambda_4$, at a total data rate DRS=10 Gbit/sec. $FOC_1$ may also carry upstream or downstream optical signal samples that are carried over $\lambda_2$ and $\lambda_3$ at corresponding data rates $DR_3$ and $DR_4$, where $DR_3=DR_4=2.5$ Gbit/sec.

In such a case, the GADM is preferably replaced by a random ADM (RADM) which is preferably operative to drop or add optical signal samples provided within a plurality of bands around a plurality of wavelengths as well as optical signal samples that are carried over discrete channel wavelengths if necessary. The output of the optical converter unit 330 in such a case preferably includes a broadband combined series of upstream optical signal samples having a waveform that is not centered around $\lambda_7$.

Figure 5A:
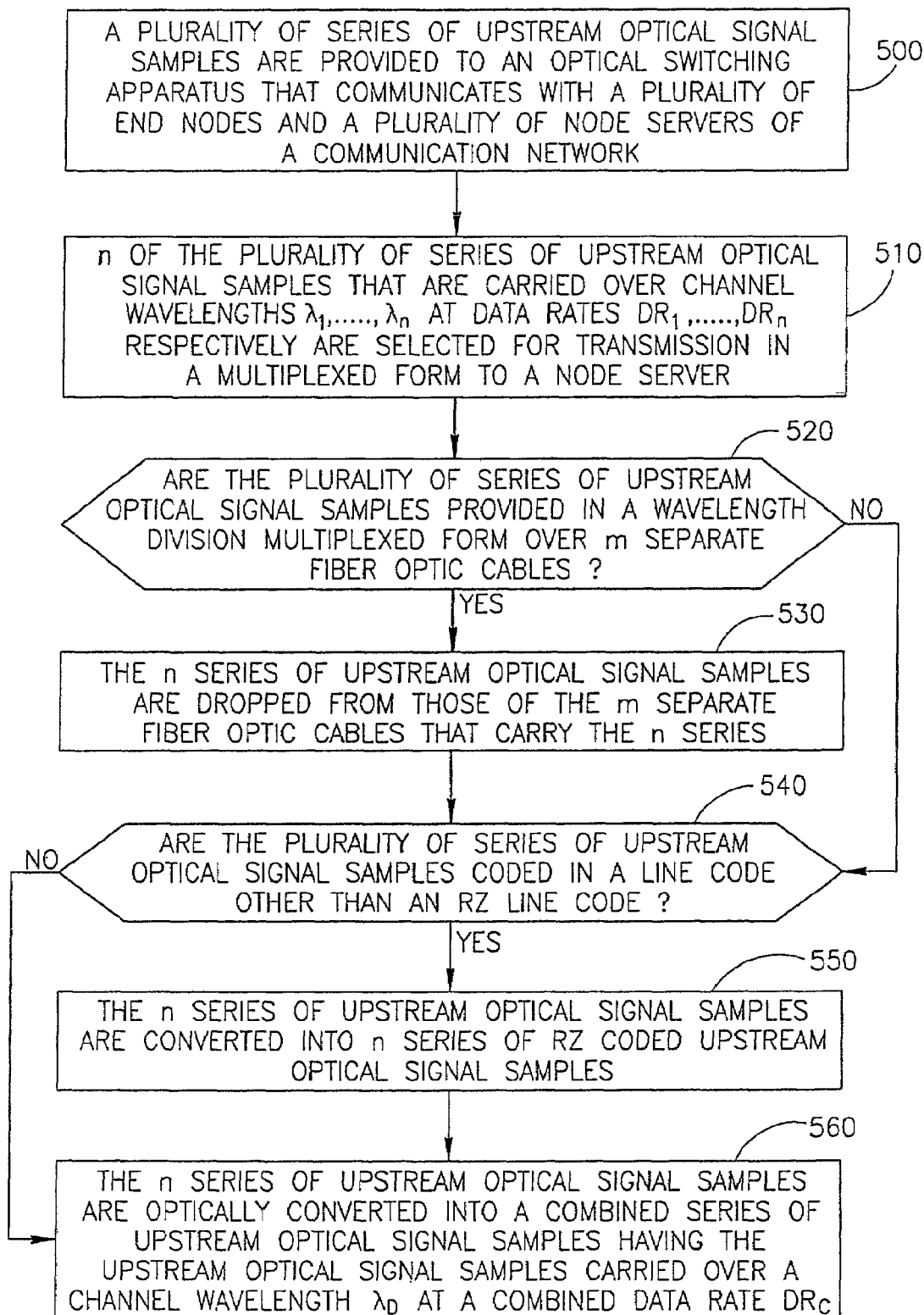
FIGS. 5A–5C together constitute a simplified flowchart illustration of a preferred method of operation of the apparatus of FIGS. 1–4.
Figure 5B:
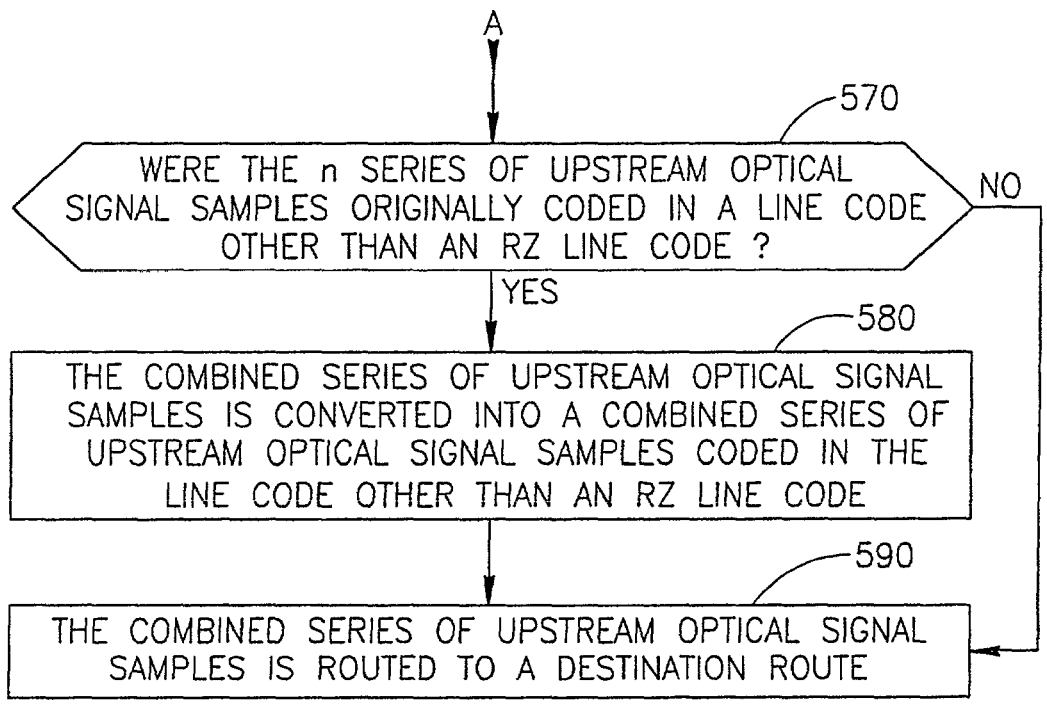

Reference is now made to FIGS. 5A and 5B that together constitute a simplified flowchart illustration of a preferred method of operation of the apparatus of FIGS. 1–4 in upstream communication.

A plurality of series of upstream optical signal samples are preferably provided to an optical switching apparatus that communicates with a plurality of end nodes and a plurality of node servers of a communication network (step 500). Preferably, n of the plurality of series of upstream optical signal samples that are carried over channel wavelengths $\lambda_1, \ldots, \lambda_n$ at data rates $DR_1, \ldots, DR_n$ respectively are selected for transmission in a multiplexed form to a node server (step 510).

If the plurality of series of upstream optical signal samples are provided to the optical switching apparatus in a wavelength division multiplexed form over m separate fiber optic cables (step 520), the n series of upstream optical signal samples are preferably dropped from those of the m separate fiber optic cables that carry the n series of upstream optical signal samples (step 530).

If the plurality of series of upstream optical signal samples are coded in a line code other than an RZ line code (step 540), the n series of upstream optical signal samples are preferably converted into n series of RZ coded upstream optical signal samples (step 550).

Preferably, the n series of upstream optical signal samples are optically converted into a combined series of upstream optical signal samples having the upstream optical signal samples carried over a channel wavelength $\lambda_D$ at a combined data rate $DR_c$ which is greater than any one of $DR_1, \ldots, DR_n$ (step 560). If the n series of optical signal samples were originally coded in a line code other than an RZ line code (step 570), the combined series of upstream optical signal samples is preferably converted into a combined series of upstream optical signal samples coded in the line code other than an RZ line code (step 580). The combined series of upstream optical signal samples is then routed to a destination route for transmission at the combined data rate $DR_c$ to the node server (step 590).

Figure 5C:
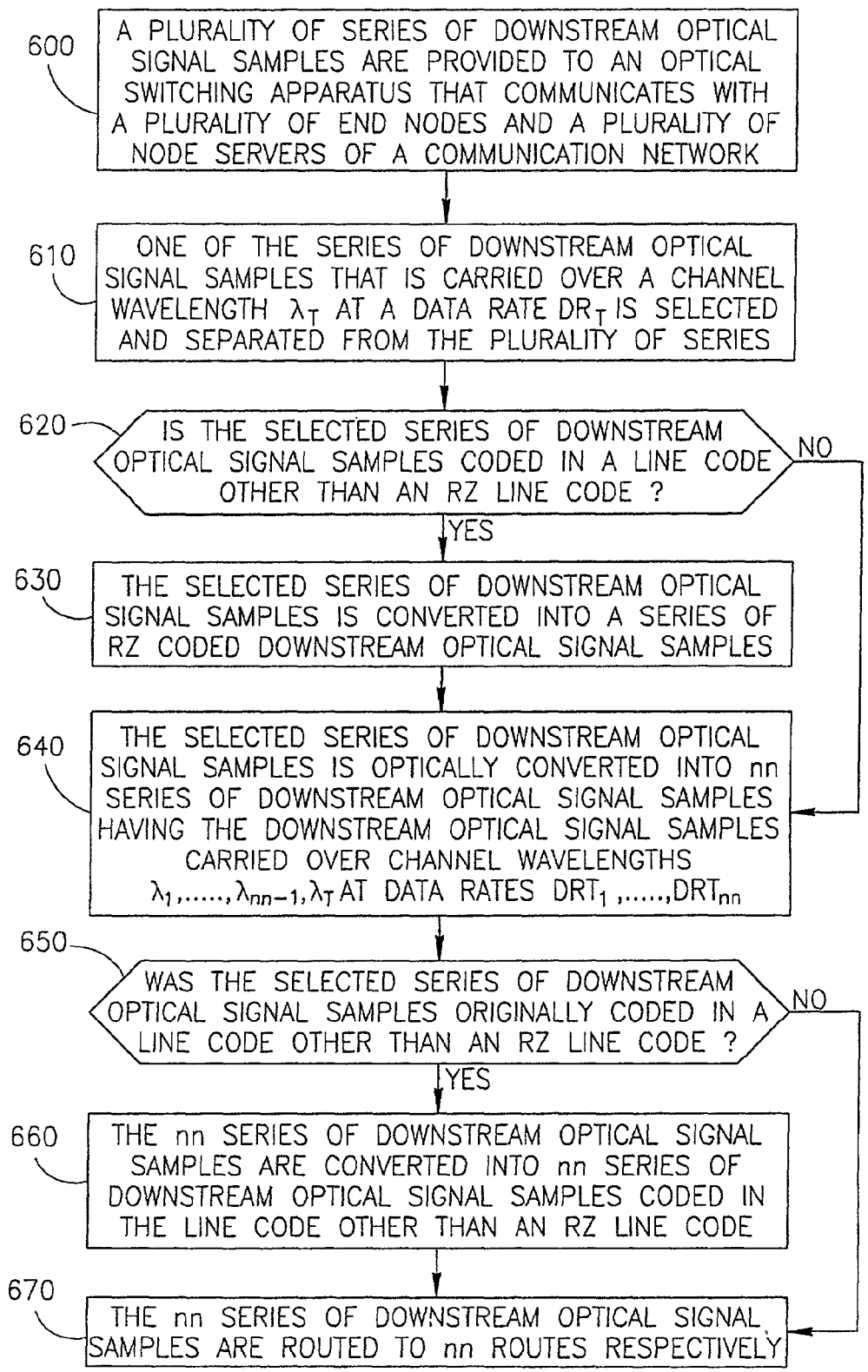

Reference is now made to FIG. 5C which is a simplified flowchart illustration of a preferred method of operation of the apparatus of FIGS. 1–4 in downstream communication.

A plurality of series of downstream optical signal samples are preferably provided to an optical switching apparatus that communicates with a plurality of end nodes and a plurality of node servers of a communication network (step 600). One of the series of downstream optical signal samples that is carried over a channel wavelength $\lambda_T$ at a data rate $DR_T$ is preferably selected and separated (step 610) from the plurality of series of downstream optical signal samples.

If the selected series of downstream optical signal samples is coded in a line code other than an RZ line code (step 620), the selected series of downstream optical signal samples is preferably converted into a series of RZ coded downstream optical signal samples (step 630).

Preferably, the selected series of downstream optical signal samples is optically converted into nn series of downstream optical signal samples having the downstream optical signal samples carried over channel wavelengths $\lambda_1, \ldots, \lambda_{nn-1}, \lambda_T$ at data rates $DRT_1, \ldots, DRT_{nn}$ (step 640), where nn is an integer, $\lambda_1 \# \lambda_T, \ldots, \lambda_{nn-1} \# \lambda_T$ and each of $DRT_1, \ldots, DRT_{nn}$ is less than $DR_T$.

If the selected series of downstream optical signal samples was originally coded in a line code other than an RZ line code (step 650), the nn series of downstream optical signal samples are preferably converted into nn series of RZ coded downstream optical signal samples (step 660). Preferably, the nn series of downstream optical signal samples are respectively routed to nn routes for transmission, for example, to nn end nodes (step 670).

It is appreciated that various features of the invention that are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described herein above. Rather the scope of the invention is defined by the claims that follow.

What is claimed is:

1. An optical switching method for switching to a destination route upstream optical signal samples that are obtained from a first source by a spread spectrum technique, and upstream optical signal samples that are obtained from additional NCC sources and comprise at least one of the following: upstream optical signal samples that are separately obtained from NS out of the NCC sources by said spread spectrum technique; and n series of upstream optical signal samples that are separately obtained from n out of the NCC sources and are carried over n discrete channel wavelengths, wherein the upstream optical signal samples obtained from said first source are provided at a data rate DRS, the upstream optical signal samples obtained from the NS sources are provided at data rates $DRSS_j$, and each series of upstream optical signal samples in the n series of upstream optical signal samples is carried over a discrete channel wavelength $\lambda_i$ at a data rate $DR_i$, where each of NCC, n and NS is an integer greater than or equal to one, i is an index running from 1 to n, and j is an index running from 1 to NS, the method comprising:
    optically converting said upstream optical signal samples that are obtained from said first source and said upstream optical signal samples that are obtained from said additional NCC sources into a broadband combined series of upstream optical signal samples at a combined data rate $DR_c$ which is greater than each of the following: DRS; any separate $DRSS_j$; and any separate $DR_i$; and
    routing said broadband combined series of upstream optical signal samples to said destination route.

2. A method according to claim 1 and wherein each of said upstream optical signal samples obtained from the first source and said upstream optical signal samples obtained from the NS sources comprises upstream optical signal samples that occupy a wavelength band, and said optically converting comprises:
    dropping said upstream optical signal samples obtained from the first source and at least one of the following: said upstream optical signal samples that are separately obtained from said NS sources, and the n series of upstream optical signal samples;
    converting the dropped upstream optical signal samples obtained from the first source into a first series of upstream optical signal samples centered around a channel wavelength $\lambda_D$, and respectively converting at least one of the following: the dropped upstream optical signal samples that are separately obtained from said NS sources into NS series of upstream optical signal samples centered around said channel wavelength $\lambda_D$, and any of the $\lambda_i$ that differ from $\lambda_D$ to $\lambda_D$ thereby forming a group of n series of upstream optical signal samples having the upstream optical signal samples carried over $\lambda_D$; and
    combining the following to obtain said broadband combined series of upstream optical signal samples: all said series of upstream optical signal samples centered around said channel wavelength $\lambda D$; and the n series of upstream optical signal samples in said group.

3. A method according to claim 2 and also comprising selecting said channel wavelength $\lambda_D$ prior to said converting.

4. A method according to claim 1 and wherein each of said upstream optical signal samples obtained from the first source and said upstream optical signal samples obtained from the NS sources comprises upstream optical signal samples that are randomly spread in a plurality of bands around a plurality of wavelengths, and said optically converting comprises:
    dropping said upstream optical signal samples obtained from the first source and at least one of the following: said upstream optical signal samples that are separately obtained from said NS sources, and the n series of upstream optical signal samples;
    converting the dropped upstream optical signal samples obtained from the first source into a first broadband series of upstream optical signal samples and respectively converting at least one of the following: the dropped upstream optical signal samples that are separately obtained from said NS sources into NS broadband series of upstream optical signal samples, and any of the $\lambda_i$ to a channel wavelength $\lambda_D$ thereby forming a group of n series of upstream optical signal samples having the upstream optical signal samples carried over $\lambda_D$; and
    respectively combining the following to obtain said broadband combined series of upstream optical signal samples: the first broadband series of upstream optical signal samples, the NS broadband series of upstream optical signal samples, and the n series of upstream optical signal samples in said group.

5. A method according to claim 1 and wherein said destination route comprises at least one of the following: a destination fiber optic cable capable of carrying optical signal samples at said combined data rate $DR_c$; a wireless communication route; a waveguide; a transmission line; an interface to a destination optical transceiver; and an interface to a destination optical communication system capable of operating at said combined data rate $DR_c$.

6. An optical switching method for switching to nn routes a broadband series of downstream optical signal samples obtained by utilizing a spread spectrum technique, where nn is an integer greater than one and the broadband series of downstream optical signal samples is provided at a data rate $DR_T$, the method comprising:
    optically converting the broadband series of downstream optical signal samples into nn series of downstream optical signal samples at data rates $DRT_1, \ldots, DRT_{nn}$, the nn series of downstream optical signal samples comprising at least one of the following: NT broadband series of downstream optical signal samples; and NST series of downstream optical signal samples having the downstream optical signal samples carried over discrete channel wavelengths, where each of nn, NT and NST is an integer greater than or equal to one, and each of $DRT_1, \ldots, DRT_{nn}$ is less than $DR_T$; and routing said nn series of downstream optical signal samples to the nn routes respectively.

7. A method according to claim 6 and wherein said broadband series of downstream optical signal samples obtained by utilizing a spread spectrum technique comprises downstream optical signal samples that occupy a wavelength band, and said optically converting comprises:

separating said broadband series of downstream optical signal samples into nn series of downstream optical signal samples comprising at least one of the following: NT broadband series of downstream optical signal samples centered around a channel wavelength $\lambda_T$, and NST series of downstream optical signal samples each having the downstream optical signal samples carried over $\lambda_T$;

respectively converting at least one of the following: the NT broadband series of downstream optical signal samples centered around $\lambda_T$ into NT broadband series of downstream optical signal samples centered around NT channel wavelengths of which NT−1 channel wavelengths are different from $\lambda_T$, and said NST series of downstream optical signal samples into NST series of downstream optical signal samples having the downstream optical signal samples carried over NST channel wavelengths of which NST−1 channel wavelengths are different from $\lambda_T$; and respectively adding said NT broadband series of downstream optical signal samples centered around NT channel wavelengths to NT routes of said nn routes, and said NST series of downstream optical signal samples carried over the NST channel wavelengths to NST routes of said nn routes.

8. A method according to claim 6 and wherein said broadband series of downstream optical signal samples obtained by utilizing a spread spectrum technique comprises downstream optical signal samples that are randomly spread in a plurality of bands around a plurality of wavelengths, and said optically converting comprises:

separating said broadband series of downstream optical signal samples into nn series of downstream optical signal samples comprising at least one of the following: NT broadband series of downstream optical signal samples, and NST series of downstream optical signal samples each having the downstream optical signal samples carried over $\lambda_T$;

respectively converting at least one of the following: the NT broadband series of downstream optical signal samples into NT broadband series of downstream optical signal samples randomly spread in a plurality of bands around a plurality of wavelengths, and said NST series of downstream optical signal samples into NST series of downstream optical signal samples having the downstream optical signal samples carried over NST channel wavelengths of which NST−1 channel wavelengths are different from $\lambda_T$; and respectively adding said NT broadband series of downstream optical signal samples randomly spread in a plurality of bands around a plurality of wavelengths to NT routes of said nn routes, and said NST series of downstream optical signal samples carried over the NST channel wavelengths to NST routes of said nn routes.

9. An optical switching apparatus that switches to a destination route upstream optical signal samples that are obtained from a first source by a spread spectrum technique, and upstream optical signal samples that are obtained from additional NCC sources and comprise at least one of the following: upstream optical signal samples that are separately obtained from NS sources by said spread spectrum technique; and n series of upstream optical signal samples that are separately obtained from n sources and are carried over n discrete channel wavelengths, wherein the upstream optical signal samples obtained from said first source are provided at a data rate DRS, the upstream optical signal samples obtained from the NS sources are provided at data rates $DRSS_j$, and each series of upstream optical signal samples in the n series of upstream optical signal samples is carried over a discrete channel wavelength $\lambda_i$ at a data rate $DR_i$, where each of NCC, n and NS is an integer greater than or equal to one, i is an index running from 1 to n, and j is an index running from 1 to NS, the apparatus comprising:

an upstream optical converter unit operative to convert said upstream optical signal samples that are obtained from said first source and said upstream optical signal samples that are obtained from said additional NCC sources into a broadband combined series of upstream optical signal samples at a combined data rate $DR_c$ which is greater than each of the following: DRS; any separate $DRSS_j$; and any separate $DR_i$; and an upstream router operatively associated with the upstream optical converter unit and operative to route said broadband combined series of upstream optical signal samples to said destination route.

10. Apparatus according to claim 9 and wherein each of said upstream optical signal samples obtained from the first source and said upstream optical signal samples obtained from the NS sources comprises upstream optical signal samples that occupy a wavelength band, and said upstream optical converter unit comprises:

a multiplexing/demultiplexing unit comprising:
   a grouped add-drop multiplexer (GADM) which is operative to drop said upstream optical signal samples obtained from the first source, and
   at least one of the following: NS grouped ADMs operative to drop said upstream optical signal samples that are separately obtained from said NS sources, and at least one ADM operative to drop the n series of upstream optical signal samples;

an upstream wavelength converter unit operatively associated with the multiplexing/demultiplexing unit and comprising:
   a broadband wavelength converter operatively associated with the GADM and operative to convert the upstream optical signal samples obtained from the first source that are dropped by the GADM into a first series of upstream optical signal samples centered around a channel wavelength $\lambda_D$, and
   at least one of the following: NS broadband wavelength converters operatively associated with the NS grouped ADMs and operative to convert the dropped upstream optical signal samples that are separately obtained from said NS sources into NS series of upstream optical signal samples centered around said channel wavelength $\lambda_D$, and at least one wavelength converter operative to convert any of the $\lambda_i$ that differ from $\lambda_D$ to $\lambda_D$ thereby forming a group of n series of upstream optical signal samples having the upstream optical signal samples carried over $\lambda_D$; and a combiner operatively associated with the upstream wavelength converter unit and operative to obtain said broadband combined series of upstream optical signal samples by combining the following: all said series of upstream optical signal samples centered around said channel wavelength $\lambda_D$; and the n series of upstream optical signal samples in said group.

11. Apparatus according to claim 9 and wherein each of said upstream optical signal samples obtained from the first source and said upstream optical signal samples obtained from the NS sources comprises upstream optical signal samples that are randomly spread in a plurality of bands around a plurality of wavelengths, and said upstream optical converter unit comprises:
- a multiplexing/demultiplexing unit comprising:
  - a random add-drop multiplexer (RADM) which is operative to drop said upstream optical signal samples obtained from the first source, and
  - at least one of the following: NS random ADMs operative to drop said upstream optical signal samples that are separately obtained from said NS sources, and at least one ADM operative to drop the n series of upstream optical signal samples;
- an upstream wavelength converter unit operatively associated with the multiplexing/demultiplexing unit and comprising:
  - a broadband wavelength converter operatively associated with the RADM and operative to convert the upstream optical signal samples obtained from the first source that are dropped by the RADM into a first broadband series of upstream optical signal samples, and
  - at least one of the following: NS broadband wavelength converters operatively associated with the NS random ADMs and operative to convert the dropped upstream optical signal samples that are separately obtained from said NS sources into NS broadband series of upstream optical signal samples, and at least one wavelength converter operative to convert any of the $\lambda_i$ to a channel wavelength $\lambda_D$ thereby forming a group of n series of upstream optical signal samples having the upstream optical signal samples carried over $\lambda_D$; and
- a combiner operatively associated with the upstream wavelength converter unit and operative to obtain said broadband combined series of upstream optical signal samples by respectively combining the following: the first broadband series of upstream optical signal samples, the NS broadband series of upstream optical signal samples, and the n series of upstream optical signal samples in said group.

12. An optical switching apparatus that switches to nn routes a broadband series of downstream optical signal samples obtained by utilizing a spread spectrum technique, where nn is an integer greater than one and the broadband series of downstream optical signal samples is provided at a data rate $DR_T$, the apparatus comprising:
- a downstream optical converter unit operative to convert the broadband series of downstream optical signal samples into nn series of downstream optical signal samples at data rates $DRT_1, \ldots, DRT_{nn}$, the nn series of downstream optical signal samples comprising at least one of the following: NT broadband series of downstream optical signal samples; and NST series of downstream optical signal samples having the downstream optical signal samples carried over discrete channel wavelengths, where each of nn, NT and NST is an integer greater than or equal to one, and each of $DRT_1, \ldots, DRT_{nn}$ is less than $DR_T$; and
- a downstream router operatively associated with the downstream optical converter unit and operative to route said nn series of downstream optical signal samples to the nn routes respectively.

13. Apparatus according to claim 12 and wherein said broadband series of downstream optical signal samples obtained by utilizing a spread spectrum technique comprises downstream optical signal samples that occupy a wavelength band, and said downstream optical converter unit comprises:
- a demultiplexer operative to separate said broadband series of downstream optical signal samples into nn series of downstream optical signal samples comprising at least one of the following: NT broadband series of downstream optical signal samples centered around a channel wavelength $\lambda_T$, and NST series of downstream optical signal samples each having the downstream optical signal samples carried over $\lambda_T$;
- a downstream wavelength converter unit operatively associated with the demultiplexer and comprising at least one of the following: NT broadband wavelength converters operative to convert the NT broadband series of downstream optical signal samples centered around $\lambda_T$ into NT broadband series of downstream optical signal samples centered around NT channel wavelengths of which NT−1 channel wavelengths are different from $\lambda_T$, and at least one wavelength converter operative to convert said NST series of downstream optical signal samples into NST series of downstream optical signal samples having the downstream optical signal samples carried over NST channel wavelengths of which NST−1 channel wavelengths are different from $\lambda_T$; and
- a multiplexing/demultiplexing unit comprising at least one of the following: NT grouped add-drop multiplexers (GADMs) operative to add said NT broadband series of downstream optical signal samples centered around NT channel wavelengths to NT routes of said nn routes respectively; and NST add-drop multiplexers operative to add said NST series of downstream optical signal samples carried over the NST channel wavelengths to NST routes of said nn routes respectively.

14. Apparatus according to claim 12 and wherein said broadband series of downstream optical signal samples obtained by utilizing a spread spectrum technique comprises downstream optical signal samples that are randomly spread in a plurality of bands around a plurality of wavelengths, and said downstream optical converter unit comprises:
- a demultiplexer operative to separate said broadband series of downstream optical signal samples into nn series of downstream optical signal samples comprising at least one of the following: NT broadband series of downstream optical signal samples, and NST series of downstream optical signal samples each having the downstream optical signal samples carried over $\lambda_T$;
- a downstream wavelength converter unit operatively associated with the demultiplexer and comprising at least one of the following: NT broadband wavelength converters operative to convert the NT broadband series of downstream optical signal samples into NT broadband series of downstream optical signal samples randomly spread in a plurality of bands around a plurality of wavelengths, and at least one wavelength converter operative to convert said NST series of downstream optical signal samples into NST series of downstream optical signal samples having the downstream optical signal samples carried over NST channel wavelengths of which NST−1 channel wavelengths are different from $\lambda_T$; and a multiplexing/demultiplexing unit comprising at least one of the following: NT random add-drop multiplexers (RADMs) operative to add said NT broadband series of downstream optical signal samples randomly spread in a plurality of bands around a plurality of wavelengths to NT routes out of said nn routes respectively; and NST add-drop multiplexers operative to add said NST series of downstream optical signal samples carried over the NST channel wavelengths to NST routes out of said nn routes respectively.

15. A method of communicating between a node server and an end node of an optical communication network, the method comprising: transmitting an optical communication signal between the server and the end node, optical communication signal comprising a broadband series of optical signal samples having the optical signal samples carried at a data rate $DR_c$, the broadband series of optical signal samples being produced by optically converting optical signal samples that are obtained from a first source by a spread spectrum technique, and optical signal samples that are obtained from additional NCC sources and comprise at least one of the following: optical signal samples that are separately obtained from NS out of the NCC sources by said spread spectrum technique; and n series of optical signal samples that are separately obtained from n out of the NCC sources and are carried over n discrete channel wavelengths, wherein the optical signal samples obtained from said first source are provided at a data rate DRS, the optical signal samples obtained from the NS sources are provided at data rates $DRSS_j$, and each series of optical signal samples in the n series of optical signal samples has the optical signal samples carried at a data rate $DR_i$, where each of NCC, n and NS is an integer greater than or equal to one, i is an index running from 1 to n, and j is an index running from 1 to NS, and $DR_c$ is greater than each of the following: DRS; any separate $DRSS_j$; and any separate $DR_i$.

16. A communication network comprising a node server, a plurality of end nodes, and a communication switch comprising the optical switching apparatus of claim 9 in operative association with the node server and the plurality of end nodes.

17. A communication network comprising a node server, a plurality of end nodes, and a communication switch comprising the optical switching apparatus of claim 12 in operative association with the node server and the plurality of end nodes.

* * * * *